United States Patent
Bennett et al.

(10) Patent No.: US 9,197,030 B2
(45) Date of Patent: Nov. 24, 2015

(54) FEW MODE RARE EARTH DOPED OPTICAL FIBERS FOR OPTICAL AMPLIFIERS, AND AMPLIFIERS USING SUCH FIBERS

(71) Applicant: Corning Incorporated, Corning, NY (US)

(72) Inventors: Kevin Wallace Bennett, Hammondsport, NY (US); Konstantin Sergeevich Koreshkov, St. Petersburg (RU); Andrey Evgenievich Korolev, St. Petersburg (RU); Dmitri Vladislavovich Kuksenkov, Elmira, NY (US); Ming Jun Li, Horseheads, NY (US); Vladimir Nikolaevich Nazarov, St. Petersburg (RU)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/954,165

(22) Filed: Jul. 30, 2013

(65) Prior Publication Data
US 2014/0036348 A1 Feb. 6, 2014

Related U.S. Application Data

(60) Provisional application No. 61/677,844, filed on Jul. 31, 2012.

(51) Int. Cl.
*H01S 3/067* (2006.01)
*G02B 6/02* (2006.01)
*H01S 3/16* (2006.01)
(Continued)

(52) U.S. Cl.
CPC .............. *H01S 3/06754* (2013.01); *G02B 6/02* (2013.01); *H01S 3/06729* (2013.01); *G02B 6/0288* (2013.01); *G02B 6/02395* (2013.01); *G02B 6/0365* (2013.01); *G02B 6/03611* (2013.01); *G02B 6/03694* (2013.01); *H01S 3/0804* (2013.01); *H01S 3/1608* (2013.01); *H01S 3/1618* (2013.01); *H01S 3/1693* (2013.01)

(58) Field of Classification Search
CPC .............. G02B 6/02023; G02B 6/0365; H01S 3/06729; H01S 3/06754
USPC ........................................... 359/341.1–341.3
See application file for complete search history.

(56) References Cited

U.S. PATENT DOCUMENTS

| 4,474,830 A | 10/1984 | Taylor |
| 4,851,165 A | 7/1989 | Rennell, Jr. et al. |

(Continued)

OTHER PUBLICATIONS

Yung et al. "First demonstration of multimode amplifier for spatial division multiplexed transmission systems" European Conference and Exposition on Optical Communications. Optical Society of America, 2011.*

(Continued)

*Primary Examiner* — Eric Bolda
(74) *Attorney, Agent, or Firm* — Svetlana Z. Short

(57) ABSTRACT

According to some embodiments a few moded optical fiber includes a glass core structured to provide light amplification at an amplification wavelength and a cladding surrounding the core. According to some embodiments the core of the few moded optical fiber includes a portion that has an average concentration of rare earth dopant which is lower by at least 30%, and preferably by at least 50%, than the average concentration of the rare earth dopant at another portion of the core that is situated further from the core center.

15 Claims, 13 Drawing Sheets

(51) Int. Cl.
G02B 6/028 (2006.01)
H01S 3/08 (2006.01)
G02B 6/036 (2006.01)

(56) References Cited

U.S. PATENT DOCUMENTS

| | | | |
|---|---|---|---|
| 4,962,992 A | 10/1990 | Chapin et al. | |
| 5,104,433 A | 4/1992 | Chapin et al. | |
| 5,970,198 A * | 10/1999 | Inagaki et al. | 385/127 |
| 6,326,416 B1 | 12/2001 | Chien et al. | |
| 6,363,194 B1 * | 3/2002 | DiGiovanni et al. | 385/123 |
| 6,434,311 B1 * | 8/2002 | Danziger et al. | 385/126 |
| 6,484,974 B1 | 11/2002 | Franke et al. | |
| 6,531,522 B1 | 3/2003 | Winningham | |
| 6,539,152 B1 | 3/2003 | Fewkes et al. | |
| 6,563,996 B1 | 5/2003 | Winningham | |
| 6,717,721 B2 | 4/2004 | Kent et al. | |
| 6,869,981 B2 | 3/2005 | Fewkes et al. | |
| 7,010,206 B1 | 3/2006 | Baker et al. | |
| 7,221,842 B2 | 5/2007 | Baker et al. | |
| 7,397,599 B2 | 7/2008 | Bourova et al. | |
| 7,423,105 B2 | 9/2008 | Winningham | |
| 8,498,044 B2 * | 7/2013 | Kashiwagi et al. | 359/341.1 |
| 2001/0043288 A1 | 11/2001 | Smith | |
| 2003/0016441 A1 * | 1/2003 | Leplingard et al. | 359/341.1 |
| 2007/0206900 A1 | 9/2007 | Po | |
| 2007/0206912 A1 * | 9/2007 | Minelly et al. | 385/124 |
| 2009/0252456 A1 * | 10/2009 | Rasras | 385/43 |
| 2009/0324168 A1 * | 12/2009 | Hotoleanu et al. | 385/28 |
| 2010/0008633 A1 * | 1/2010 | Digiovanni et al. | 385/123 |
| 2010/0027938 A1 * | 2/2010 | Digiovanni et al. | 385/29 |
| 2010/0329670 A1 | 12/2010 | Essiambre et al. | |
| 2011/0091178 A1 * | 4/2011 | Gapontsev et al. | 385/127 |
| 2011/0149383 A1 * | 6/2011 | Kashiwagi et al. | 359/341.3 |
| 2013/0071114 A1 * | 3/2013 | Bickham et al. | 398/44 |

OTHER PUBLICATIONS

Bai et al.; "Multimode Fiber Amplifier With Tunabl Modal Gain Using a Reconfigurable Multimode Pump"; Aug. 2011 / vol. 19, No. 17 / Optics Express 16601.
Lenahan; "Calculation of Modes in an Optical Fiber Using the Finite Element Method and Eispack"; The Bell System Technical Journal; Nov. 1983/vol. 62, No. 9 Part 1.

* cited by examiner

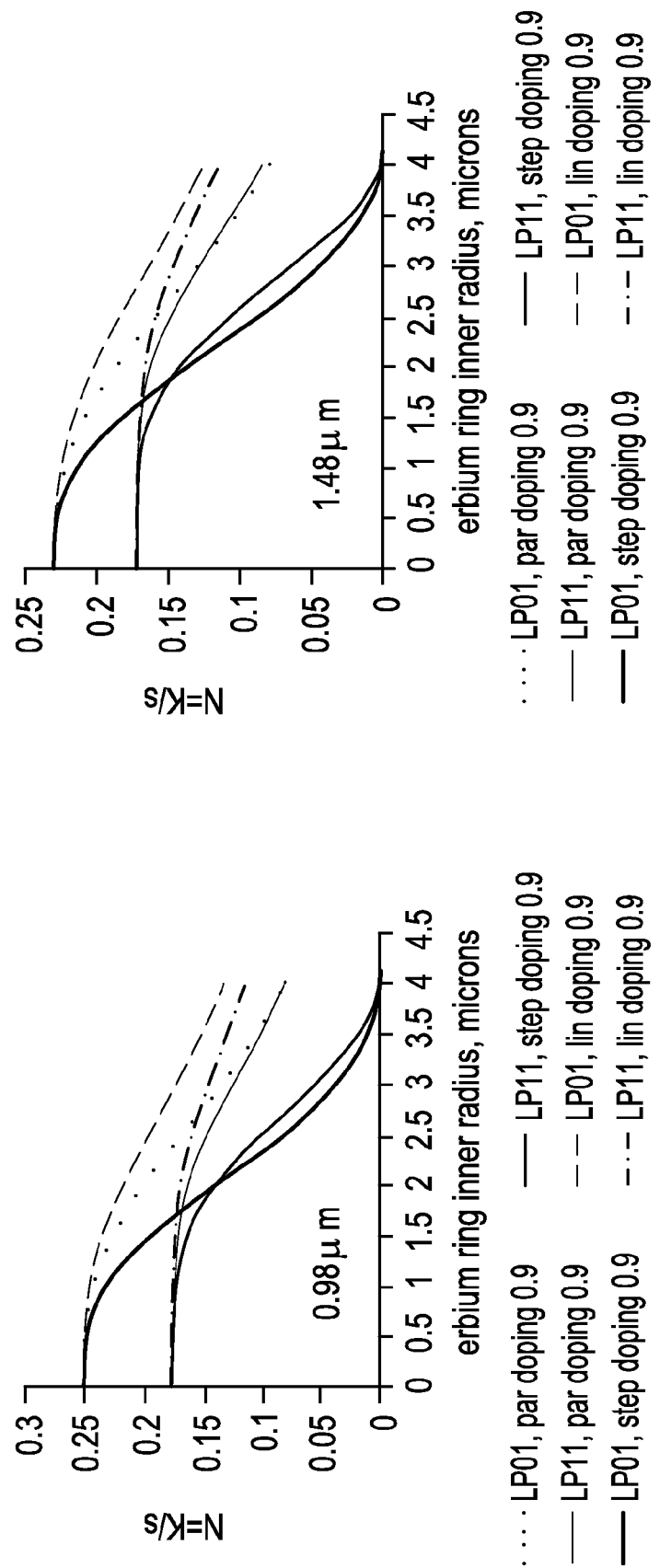

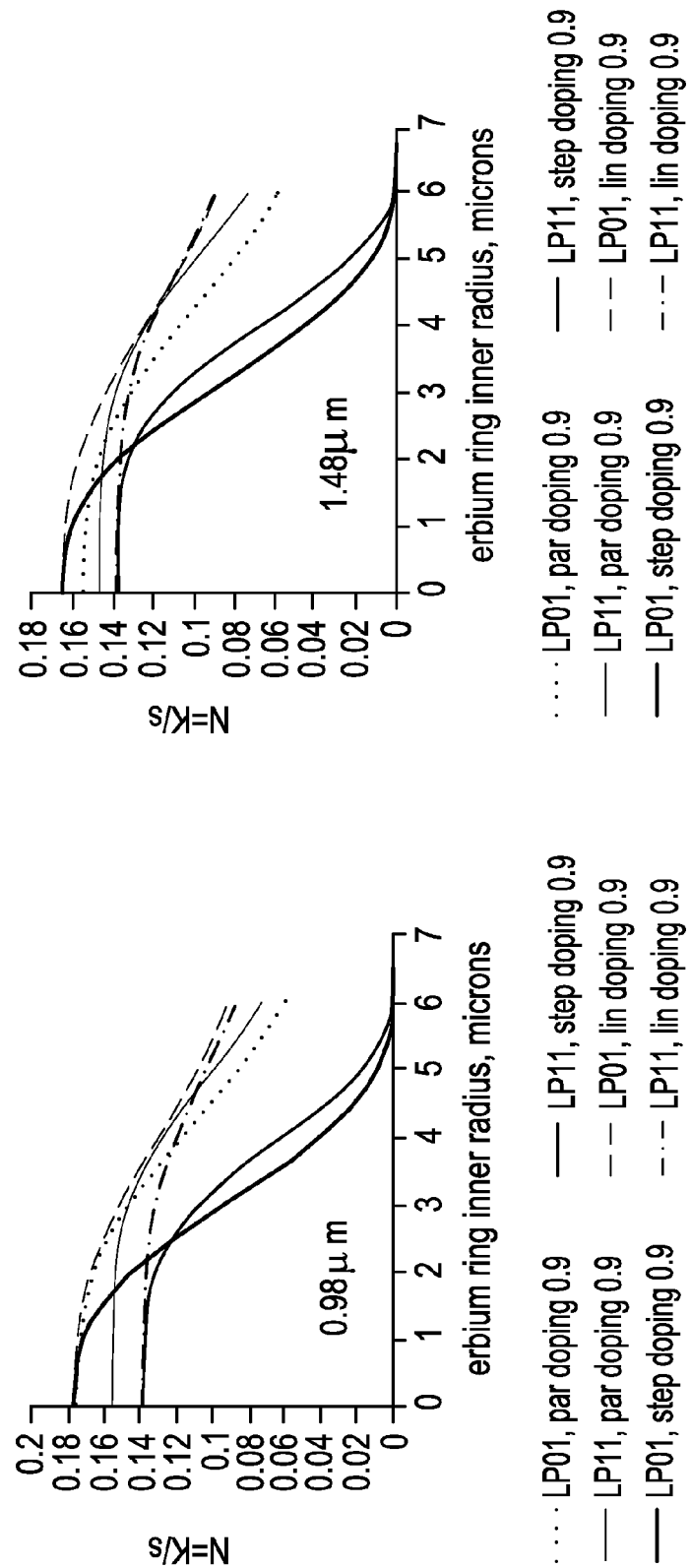

|       | LP01,s | LP11,s |
|-------|--------|--------|
| LP01,p | 0.0483 | 0.0281 |
| LP11,p | 0.0345 | 0.0322 |

|       | LP01,s | LP11,s |
|-------|--------|--------|
| LP01,p | 0.0222 | 0.0220 |
| LP11,p | 0.0266 | 0.0295 |

|       | LP01,s | LP11,s |
|-------|--------|--------|
| LP01,p | 0.0258 | 0.0236 |
| LP11,p | 0.0288 | 0.0306 |

|       | LP01,s | LP11,s |
|-------|--------|--------|
| LP01,p | 0.0335 | 0.0333 |
| LP11,p | 0.0332 | 0.0339 |

FEW MODE RARE EARTH DOPED OPTICAL FIBERS FOR OPTICAL AMPLIFIERS, AND AMPLIFIERS USING SUCH FIBERS

CROSS-REFERENCE TO RELATED APPLICATIONS

This application claims the benefit of priority under 35 U.S.C. §119 of U.S. Provisional Application Ser. No. 61/677,844 filed on Jul. 31, 2012 the content of which is relied upon and incorporated herein by reference in its entirety.

FIELD

The present specification generally relates to optical fibers and, more specifically, to rare earth doped, few moded optical fibers used in optical amplifiers.

BACKGROUND

Typical optical transmission systems use single mode (SM) optical fibers for transmission of optical signals, and optical amplifiers that utilize single mode rare earth doped fibers to amplify the transmitted signal. However, the explosive growth in the volume and variety of multi-media telecommunication applications continues to drive speed demands for internet traffic and motivate research in backbone fiber-optic communication links. Mode division multiplexing (MDM) is an attractive approach to increase optical fiber transmission capacity. In MDM, an optical fiber supporting a few modes is used where each mode carries an independent information channel. In this way, the information capacity is increased by a factor of X, where X is the number of modes in the fiber. However, in order to achieve MDM over long-haul distances, erbium-doped fiber amplifiers (EDFA) are required. Current EDFAs are designed for single mode fiber transmissions. When single mode EDFAs are used for MDM systems, the modes from an input few mode transmission fiber need to be de-multiplexed first. Then each mode is amplified separately by a single mode EDFA. After amplification, the output single mode signals from amplifiers need to be multiplexed back to the modes in an output few mode transmission fiber. This process is complex and not cost effective.

SUMMARY

According to some embodiments a few moded optical fiber includes a glass core structured to provide light amplification at an amplification wavelength and a cladding surrounding the core. According to some embodiments the core of the few moded optical fiber includes a (first) portion that has an average concentration of rare earth dopant which is much lower (by at least 30%, preferably by at least 40% and more preferably by at least 50%) than the average concentration of the rare earth dopant at another (second) portion of the core that is situated further from the core center.

For example, according to some embodiments, the few moded fiber includes:

(i) the glass core having a radius $R_1$, said core containing a rare earth dopant such that the average concentration of said rare earth dopant is at least 1.5 times lower in the portion of the core with a width $W_a \geq 0.1 R_1$ that is situated within a portion of the core where $0 < r < 0.5 R_1$ than the average concentration of the rare earth dopant in at least in one portion of the core with a width Wb of at least 1 µm that is situated in a portion of the core characterized by a center radius $r_c$ where $0.5 R_1 < r_c < R_1$ (for example, $0.65 R_1 < r_c < 0.9 R_1$);

and the width $W_d$ of the core portion doped with rare earth dopant is not less than $0.1 R_1$.

According to at least some embodiments a few moded optical fiber includes:

(i) the glass core having a radius $R_1$, the core containing a rare earth dopant such that the average concentration of said rare earth dopant is at least 2 times lower in the portion of the core situated within $0 < r < 0.5 R_1$ than the average concentration of the rare earth dopant in at least in one portion of the core with a width W of at least 1 µm that is situated in a portion of the core characterized by a center radius $r_c$ where $0.5 R_1 < r_c < R_1$ (e.g., $0.65 R_1 < r_c < 0.9 R_1$); the width $W_d$ of the core portion doped with rare earth is not less than $0.1 R_1$; and (ii) the cladding is a glass cladding surrounding and in direct contact with the glass core, wherein the glass cladding comprises a maximum relative refractive index delta $\Delta_{4MAX}$ with respect to pure silica, and $\Delta_{1MAX} > \Delta_{4MAX}$. In some embodiments $0.65 R_1 < r_c < 0.9 R_1$.

According to some embodiments an optical fiber includes a glass core structured to provide light amplification at an amplification wavelength and a cladding surrounding the core, the fiber comprising:

(i) the glass core having a radius $R_1$, said core containing a rare earth dopant such that the average concentration of said rare earth dopant is at least 30% lower (and preferably at least 1.75 times or even 2 times lower) in the portion of the core situated within $0 < r < 0.15 R_1$ than the average concentration of the rare earth dopant in at least in one portion of the core with a width W of at least 1 µm that is situated in a portion of the core characterized by a center radius $r_c$ where $0.15 R_1 < r_c < R_1$; the width $W_d$ of the core portion doped with rare earth is not less than $0.1 R_1$; and (ii) the cladding is a glass cladding surrounding and in direct contact with the glass core, wherein the glass cladding comprises a maximum relative refractive index delta $\Delta_{4MAX}$ with respect to pure silica, and $\Delta_{1MAX} > \Delta_{4MAX}$. In some embodiments, $W_d \geq 0.2 R_1$, for example, $W_d \geq 0.3 R_1$, or $W_d \geq 0.4 R_1$.

Preferably, $0.2 R_1 < r_c < R_1$, more preferably, $0.25 R_1 < r_c < R_1$, and according to some embodiments $0.3 R_1 > r_c > R_1$. In some embodiments $0.4 R_1 < r_c < R_1$. In some embodiments $0.5 R_1 < r_c < R_1$. In some embodiments $0.65 R_1 < r_c < 0.9 R_1$. In some embodiments $0.15 R_1 < r_c < 0.6 R_1$. In some embodiments the width $W \geq 0.1 R_1$. In some embodiments the width $W \geq 0.2 R_1$.

Preferably the radial width $W_d$ of the core portion doped with rare earth is not less than $0.2 R_1$. In some embodiments the width $W_d$ of the core portion doped with rare earth is not less than $0.5 R_1$.

In some embodiments the rare earth doped optical fiber core has a refractive index profile structured such that the core is capable of supporting the propagation and amplification of optical signals with X number of LP modes at the amplification wavelength, wherein X is an integer greater than 1, the rare-earth dopant is at least one of: Yb, Er, Nd, Tm, Sm, Gd, Pr, and Tb, and the amplification wavelength is situated in at least one of the following wavelength bands: 625-640 nm, 940-1080 nm, 1280-1360 nm, 1440-1490 nm, 1490-1520 nm, 1530-1570 nm, 1620-1670 nm.

According to some embodiments the maximum relative refractive index delta $\Delta_{1MAX}$ is between 0.3 to 2% (and preferably between 0.4 to 1%) relative to the glass cladding, and the effective portion of LP01 mode is preferably between 50 µm² and 300 µm² at 1550 nm and a theoretical cutoff wavelength of an LP11 mode is greater than about 2.0 µm. According to some embodiments the refractive index profile of said core is constructed to provide a theoretical cutoff wavelength of an LP11 mode greater than about 2.5 µm and an LP01 effective portion greater than 140 µm² at 1550 nm.

According to some embodiments the fiber cladding includes a low index ring, and an outer cladding with a maximum relative refractive index delta $\Delta_{4MAX}$ surrounding the ring, and the minimum refractive index delta of the low index ring is between −0.6% and −0.1% (for example between −0.5% and −0.2%), relative to the outer cladding.

According to some embodiments a few moded optical fiber comprising a glass core and a cladding includes:

(i) the glass core having a radius $R_1$ from about 3 µm to about 20 µm, a maximum relative refractive index delta $\Delta_{1MAX}$ from about between 0.3% to 2% relative to the glass cladding, and refractive index profile of the core is structured such that the core is capable of supporting propagation and amplification of an optical signal with X number of LP modes at an operating wavelength (i.e., the signal or amplification wavelength) wherein X is an integer greater than 1 and less than 10;

the core containing a rare earth dopant such that the average concentration of said rare earth dopant is at least 30% lower (and preferably at least 40% or 50% lower) in the portion of the core situated within $0<r<0.15R_1$ than average concentration of the rare earth dopant in at least in one portion of the core with a width W of at least 1 µm that is situated in a portion of the core characterized by a center radius $r_c$ where $0.15R_1<r_c<R_1$; and the width $W_d$ of the core portion doped with rare earth is at least $0.1R_1$; and (ii) a glass cladding surrounding and in direct contact with the glass core, wherein the glass cladding comprises a maximum relative refractive index delta $\Delta_{4MAX}$ with respect to pure silica, and $\Delta_{1MAX}>\Delta_{4MAX}$.

According to some embodiments an optical fiber the average concentration of the rare earth dopant is at least 1.5 times and preferably at least 2 times lower in the portion of the core situated within $0<r<0.2\ R_1$ than the average concentration of the rare earth dopant in at least in one portion of the core with a width W of at least 1 µm that is situated in a portion of the core characterized by a center radius $r_c$ where $0.2R_1>r_c>R_1$. According to some embodiments an optical fiber the average concentration of the rare earth dopant is at least 1.5 times and preferably at least 2 times lower in the portion of the core situated within $0<r<0.5\ R_1$ than the average concentration of the rare earth dopant in at least in one portion of the core with a width W of at least 1 µm that is situated in a portion of the core characterized by a center radius $r_c$ where $0.5R_1>r_c>R_1$.

In some embodiments a few moded optical fiber comprises a glass core and a cladding, the fiber including:

(i) the glass core having a radius $R_1$ from about 3 µm to about 20 µm, a maximum relative refractive index delta $\Delta_{1MAX}$ from about between 0.3% to 2% relative to the glass cladding, and refractive index profile of the core is structured such that the core is capable of supporting propagation and amplification of an optical signal with X number of LP modes at an operating wavelength (i.e., the signal or amplification wavelength) wherein X is an integer greater than 1 and less than 10; the core contains a rare earth dopant such that the average concentration of said rare earth dopant is at least 1.5 times (and preferably at least 1.75 times or even 2 times lower) in the portion of the core situated within $0<r<0.5R_1$ than average concentration of the rare earth dopant in at least in one portion of the core with a width W of at least $0.1\ R_1$ that is situated in a portion of the core characterized by a center radius $r_c$ where $0.5R_1<r_c<R_1$; and the width $W_d$ of the core portion doped with rare earth is at least $0.1R_1$ (e.g., $W_d \geq 0.15\ R_1$, $W_d \geq 0.2\ R_1$, $W_d \geq 0.25\ R_1$, $W_d \geq 0.3\ R_1$, $W_d \geq 0.4\ R_1$; $W_d \geq 0.5\ R_1$, or $W_d \geq 0.6\ R_1$.)

Preferably the number X of optical modes propagating through the optical fiber core is $1 \leq X \leq 10$, more preferably $1 \leq X \leq 8$, more preferably $X<5$ at the operating (amplification or signal) wavelength. For example $1 \leq X \leq 4$, or X=2 or 3. According to some embodiments the optical fiber cladding is made of pure silica ($SiO_2$), or pure silica doped with refractive index lowering dopant such as fluorine (F), and the optical fiber core is made of $SiO_2$ doped with at least one of the refractive index raising dopants, for example $GeO_2$, $Al_2O_3$ or $P_2O_5$. Preferably, the core also contains a rare earth dopant such that the average concentration of the rare earth dopant is at least is at least 30% lower (and preferably at least 2 times lower) in the portion of the core situated within $0<r<0.15R_1$ than the average concentration of the rare earth dopant in at least in one portion of the core with a width W of at least 1 µm that is situated in a portion of the core having a center radius $r_c$ where $0.15R_1<r_c<R_1$. In some embodiments the average concentration of the rare earth dopant is at least 30% lower (and preferably at least 2 times lower) in the portion of the core situated within $0<r<0.25\ R_1$ than the average concentration of the rare earth dopant in at least in one portion of the core with a width W of at least 1 µm that is situated in a portion of the core having a center radius $r_c$ where $0.25R_1<R_c<R_1$ (and preferably $0.2R_1<r_c<R_1$, for example $0.65R_1<r_c<0.9R_1$.) In some embodiments the operating (or the amplification, or signal) wavelength is 1550 nm and the rare earth dopant is Er. In other embodiments the operating (or the amplification, or signal) wavelength is about 1060 nm and the rare earth dopant is Nd. In other embodiments the operating (i.e., the amplification, or signal) wavelength is about 2 µm (e.g., 1.9 µm to 2.1 µm) and the rare earth dopant is Tm. In other embodiments the operating (amplification, signal) wavelength is situated within the 1030 to 1080 nm range and the rare earth dopant is Yb.

According to some embodiments an optical fiber comprises:

(i) the glass core having with a radius $R_1$ from about 3 µm to about 15 µm, a maximum relative refractive index delta $\Delta_{1MAX}$ from about between 0.3% to 2% relative to the glass cladding, and refractive index profile of the core is structured such that the core is capable of supporting the propagation/transmission and amplification of an optical signal with X number of LP modes at a wavelength of 1550 nm wherein X is an integer greater than 1 and less than 10, and an effective area of LP01 mode between 20 µm² and 200 µm² at 1550 nm;

the core containing Er such that the average concentration of Er is at least 2 times lower in the portion of the core situated within $0<r<0.2\ R_1$ than the average concentration of Er in at least in one portion of the core with a width W of at least 1 µm that is situated in a portion lower in the portion of the core characterized by $0.2R_1<r<R_1$ wherein said portion of the core is doped with greater than 300 ppm of $Er_2O_3$; and (ii) a glass cladding surrounding and in direct contact with the glass core, wherein the glass cladding comprises a maximum relative refractive index delta respect to pure silica $\Delta_{4MAX}$ and $\Delta_{1MAX}>\Delta_{4MAX}$.

According to some embodiments an optical fiber comprises:

(i) the glass core having with a radius $R_1$ from about 3 µm to about 15 µm, a maximum relative refractive index delta $\Delta_{1MAX}$ from about between 0.3% to 2% relative to the glass cladding, and refractive index profile of the core is structured such that the core is capable of supporting the propagation/transmission and amplification of an optical signal with X number of LP modes at a wavelength of 1550 nm wherein X is an integer greater than 1 and less than 10, and an effective area of LP01 mode between 20 µm² and 200 µm² at 1550 nm;

the core containing a Er such that the average concentration of Er is at least 30% lower (and preferably at least 2 times lower) in the portion of the core situated within $0<r<0.5\ R_1$ average concentration of Er in at least in one portion of the core with a width W of at least 1 µm that is situated in a portion lower in the portion of the core characterized by $0.5R_1<r<R_1$ wherein said portion of the core is doped with greater than 300 ppm of $Er_2O_3$; and (ii) a glass cladding surrounding and in direct contact with the glass core, wherein the glass cladding comprises a maximum relative refractive index delta respect to pure silica $\Delta_{4MAX}$ and $\Delta_{1MAX}>\Delta_{4MAX}$.

Preferably 1<X<8, more preferably X<5 at a 1550 nm wavelength. In some embodiments 2<X<3 at a 1550 nm wavelength. Preferably, the width $W_d$ of the core portion doped with rare earth is at least $0.25R_1$. According to some embodiments, the width $W_d$ of the core portion doped with rare earth is at least $0.3R_1$. According to some embodiment the optical fiber core further includes $GeO_2$.

According to one embodiment, an optical fiber comprises a glass core and a cladding, wherein the glass core has an outer radius, $R_1$, and 3 µm≤$R_1$≤15 µm, a maximum relative refractive index delta $\Delta_{1MAX}$ relative to the glass cladding such that $0.3\%\le\Delta_{1MAX}\le 2\%$, and refractive index profile of the core is structured such that the core is capable of supporting the propagation and transmission of an optical signal with X number of LP modes at a wavelength of 1550 nm wherein X is an integer greater than 1 and less than 10, and an effective area of LP01 mode between 20 µm² and 200 µm² at 1550 nm. According to some embodiments, the core contains a non-uniform concentration of Er, such that Er concentration in a region (or portion) of the core adjacent to the core's center is smaller than Er concentration in a region (or portion) of the core of at least 1 µm width that is centered around a radius r situated within $0.3R_1<r<R_1$; and this region (or portion) of the core of at least 1 µm width is doped with greater than 300 ppm (and preferably at least 700 ppm) of $Er_2O_3$. According to other embodiments, the core contains a non-uniform concentration of Er, such that Er concentration in a region (or portion) of the core adjacent to the core's center is smaller than Er concentration in a region (or portion) of the core of at least 1 µm width that is centered around a radius r situated within $0.5R_1<r<R_1$; and this region (or portion) of the core of at least 1 µm width is doped with greater than 300 ppm (and preferably at least 700 ppm) of $Er_2O_3$. The a glass cladding surrounds and is in direct contact with the glass core, and comprises a maximum relative refractive index delta respect to pure silica $\Delta_{4MAX}$, and $\Delta_{1MAX}>\Delta_{4MAX}$.

According to some embodiments Er dopant concentration profile within at least one portion of the core increases linearly or parabolically. According to some embodiments the profile of Er dopant concentration within at least one portion of the core is ring-shaped.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIGS. 5A-5C illustrate modeling results (gain vs $R_{RE}$) for different embodiments of optical fiber 10;

DETAILED DESCRIPTION

Figure 1:
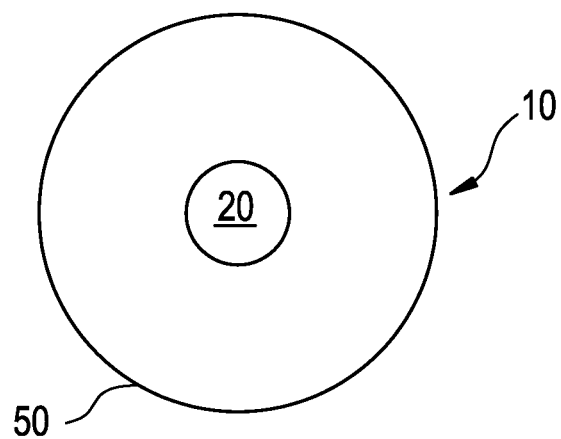
FIG. 1 schematically depicts a cross section of a few moded Er doped optical fiber according to embodiments described herein.

Reference will now be made in detail to embodiments of optical fibers for use as optical amplifiers, examples of which are illustrated in the accompanying drawings. Whenever possible, the same reference numerals are used throughout the drawings to refer to the same or like parts.

TERMINOLOGY

The following terminology will be used herein to describe the optical fibers, with some of the parameters being introduced and defined below in connection with the various example embodiments:

The term "refractive index profile," as used herein, is the relationship between the refractive index or the relative refractive index and the radius of the fiber.

The term "relative refractive index delta" as used herein, is defined as:

$$\Delta(r)=[n(r)^2-n_{REF}^2)]/2n(r)^2,$$

where n(r) is the refractive index at radius r, unless otherwise specified. The relative refractive index is defined at 1550 nm unless otherwise specified. In one aspect, the reference index $n_{REF}$ is silica glass. In another aspect, $n_{REF}$ is the refractive index of the cladding (and, if the cladding includes several cladding regions, $n_{REF}$ is the refractive index the outer cladding region). As used herein, the relative refractive index is represented by Δ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

The term "updopant," as used herein, refers to a dopant which raises the refractive index of glass relative to pure, undoped $SiO_2$. The term "downdopant," as used herein, is a dopant which has a propensity to lower the refractive index of glass relative to pure, undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

As used herein, the "effective area" $A_{eff}$ of an optical fiber is the area of the optical fiber in which light is propagated and is defined as:

$$A_{eff} = 2\pi \frac{\left(\int_0^\infty E^2 r \, dr\right)^2}{\int_0^\infty E^4 r \, dr},$$

where E is the electric field associated with light propagated in the fiber and r is the radius of the fiber. The effective area is determined at a wavelength of 1550 nm, unless otherwise specified.

Mode field diameter (MFD) is a measure of the spot size or beam width of light propagating in a single mode fiber. Mode-field diameter is a function of the source wavelength, fiber core radius and fiber refractive index profile. MFD is determined using the Peterman II method, where MFD=2w, and $$w^2 = 2 \frac{\int_0^\infty E^2 r \, dr}{\int_0^\infty (dE/dr)^2 r \, dr}$$

where E is the electric field distribution in the fiber and r is the radius of the fiber.

The cutoff wavelength of a mode is the minimum wavelength beyond which a mode ceases to propagate in the optical fiber. The cutoff wavelength of a single mode fiber is the minimum wavelength at which an optical fiber will support only one propagating mode. The cutoff wavelength of a single mode fiber corresponds to the highest cutoff wavelength among the higher order modes. Typically the highest cutoff wavelength of the single mode fiber corresponds to the cutoff wavelength of the LP11 mode. A mathematical definition of a theoretical cutoff wavelength is given in Single Mode Fiber Optics, Jeunhomme, pp. 39 44, Marcel Dekker, New York, 1990, wherein the theoretical fiber cutoff is described as the wavelength at which the mode propagation constant becomes equal to the plane wave propagation constant in the outer cladding.

As used herein, the term "few moded fiber" refers to a fiber supporting the propagation of more modes than a single mode fiber but fewer modes than a normal multimode fiber (i.e., not greater than 10 LP modes (i.e., $1 < x \le 10$). The number of propagating modes and their characteristics in a cylindrically symmetric optical fiber with an arbitrary refractive index profile is obtained by solving the scalar wave equation (see for example T. A. Lenahan, "Calculation of modes in an optical fiber using a finite element method and EISPACK," Bell Syst. Tech. J., vol. 62, no. 1, p. 2663, February 1983).

Light traveling in a few moded optical fiber forms hybrid-type modes, which are usually referred to as LP (linear polarization) modes for simplicity. The LP0p modes have two polarization degrees of freedom and are two-fold degenerate, the LP1p modes are four-fold degenerate with two spatial and two polarization degrees of freedom, and the LPmp modes with m>1 are also four-fold degenerate. We do not count these degeneracies when we designate the number of LP modes propagating in the few moded fiber. For example, an optical fiber in which only the LP01 mode propagates is a single-mode fiber, even though the LP01 mode has two possible polarizations. A few-moded optical fiber in which the L01 and LP11 modes propagate supports three spatial modes since the LP11 mode is two-fold degenerate, and each mode also has two possible polarizations, giving a total of 6 modes. Thus, when a few moded fiber is said to have two LP modes (i.e., when X=2), it is meant that the fiber supports the propagation of all of the LP01 modes and LP11 modes.

The term "amplification wavelength" refers to the gain wavelength or the center of the spectral band of gain wavelengths of the fiber, which is determined by the type of rare earth dopant(s) within the fiber core.

The term "α-profile" or "alpha profile," as used herein, refers to a relative refractive index profile, expressed in terms of Δ which is in units of "%", where r is the radius and which follows the equation, $$\Delta = \Delta_{1max}\left[1 - \left(\frac{r}{R_1}\right)^\alpha\right],$$

where $\Delta_{1MAX}$ is the maximum relative refractive index of the core, $R_1$ is the radius of the core, r is in the range $r_i \le r \le r_f$, $\Delta$ is as defined above, $r_i$ is the initial point of the α-profile, $r_f$ is the final point of the α-profile, and α is an exponent which is a real number. For few moded fiber 10 with a step index profile, the alpha value is greater than or equal to 10. For a graded index profile, the alpha value is less than 10. The term "parabolic," as used herein, includes few moded fibers that have cores with substantially parabolically shaped refractive index profiles with α=2±0.1 as well as profiles in which the curvature of the core is characterized by α=2±0.1 over the radius range from $0.1*R_1$ to $0.95*R_1$.

According to some embodiments, the few moded optical fiber 10 comprises a few moded core 20 and a cladding 50. (See FIG. 1, for example.) The cladding may be surrounded by one or more coatings (not shown). The core 20 propagates and amplifies more than 1 and no more than 10 optical modes (preferably no more 1<X<7, and more preferably no more than 4 optical modes). According to some embodiments a few moded rare earth doped fiber 10 comprises: (i) a glass core 20 having a radius $R_1$, the core 20 containing a rare earth dopant such that the average concentration of the rare earth dopant is at least 2 times lower in the portion of the core situated within $0 < r < 0.15 R_1$ than the average concentration of the rare earth dopant in at least in one portion of the core 20 with a width W of at least 1 μm that is situated in a portion of the core characterized by a center radius $r_c$ where $0.15R_1 > r_c > R_1$; wherein the width $W_d$ of the core portion doped with rare earth is not less than $0.1R_1$; and (ii) the cladding 50 is a glass cladding surrounding and in direct contact with the glass core, wherein the glass cladding comprises a maximum relative refractive index delta $\Delta_{4MAX}$ with respect to pure silica, and $\Delta_{1MAX} > \Delta_{4MAX}$.

Preferably the rare earth optical fiber core 20 of the few moded optical fiber 10 has a refractive index profile structured such that the core is capable of supporting the propagation and amplification of optical signals with X number of LP modes at the amplification wavelength, wherein X is an integer greater than 1 and the rare earth dopant is the rare-earth dopant is at least one of: Yb, Er, Nd, Tm, Sm, Gd, Pr, and Tb. Preferably, the amplification (gain) wavelength is situated in at least one of the following wavelength bands: 625-640 nm, 940-1080 nm, 1280-1360 nm, 1440-1490 nm, 1490-1520 nm, 1530-1570 nm, 1620-1670 nm.

According to some embodiments the few moded rare earth doped optical fiber 10 has the core outer radius $R_1$ of about 3 μm to about 20 μm (preferably, 3 μm to 15 μm, more preferably 3 μm to 10 μm), a maximum relative refractive index delta $\Delta_{1MAX}$ from about between 0.3% to 2% relative to the glass cladding, and refractive index profile of the core is structured such that the core is capable of supporting the propagation and amplification of optical signals with X number of LP modes at the amplification wavelength wherein X is an integer greater than 1 and less than 10. According to some embodiments X is an integer greater than 1 and less than 6, and the core does not support propagation and amplification of optical signals with more than 6 LP modes at the amplification wavelength.

According to some embodiments the glass core 20 has an outer radius $R_1$ from about 3 μm to about 20 μm, a maximum relative refractive index delta $\Delta_{1MAX}$ from about between 0.3% to 2% relative to the glass cladding 50, and refractive index profile of the core is structured such that the core is capable of supporting the propagation and amplification of an optical signal with X number of LP modes at the amplification wavelength wherein X is an integer greater than 1 and less than 10. In these embodiments the core 20 does not support propagation and amplification of optical signals with more than 10 LP modes at the amplification wavelength. The core 20 contains at least one type of a rare earth dopant such that: the average concentration of this rare earth dopant is at least 2 times lower in the portion of the core situated within $0 < r < 0.2R_1$ than the average concentration of the rare earth dopant in at least in one portion of the core with a width W of at least 1 μm that is situated in a portion of the core characterised by a center radius $r_c$ where $0.2R_1 > r_c > R_1$; and the width $W_d$ of the core portion doped with rare earth is not less than $0.1R_1$.

According to some embodiments the core 20 contains at least one type of a rare earth dopant such that: the average concentration of this rare earth dopant is at least 1.5 times and preferably at least 2 times lower in the portion of the core situated within $0 < r < 0.5 R_1$ than the average concentration of the rare earth dopant in at least in one portion of the core with a width W of at least $0.1R_1$ that is situated in a portion of the core characterized by a center radius $r_c$ where $0.5R_1 > r_c > R_1$; and the width $W_d$ of the core portion doped with rare earth is not less than $0.1R_1$ and preferably at least $0.2R_1$ and preferably at least $0.3R_1$. In some embodiments the width $W_d$ of the core portion doped with rare earth is not less than $0.5R_1$ and preferably at least $0.75R_1$.

According to some embodiments the core 20: (i) is capable of supporting the propagation and amplification of an optical signal with X number of LP modes at a wavelength of 1550 nm wherein X is an integer greater than 1 and less than 10; and (ii) contains $Er_2O_3$ such that the average concentration of $Er_2O_3$ is at least 1.5 times and preferably 2 times lower in the portion of the core situated within $0 < r < 0.2R_1$ than the average concentration of $Er_2O_3$ in at least in one portion of the core with a width W of at least 1 μm that is situated in a portion of the core characterized by a center radius $r_c$ where $0.2R_1 > r_c > R_1$ wherein the portion of the core with a with a width W is doped with greater than 200 ppm of $Er_2O_3$. Preferably, the portion of the core with a with a width W is doped with greater than 500 ppm of $Er_2O_3$, and more preferably at least 700 ppm of $Er_2O_3$. Preferably, the width W of the core portion doped with $Er_2O_3$ is at least $0.4R_1$, more preferably at least $0.5 R_1$, and in some embodiment at least $0.75 R_1$.

According to some embodiments the core 20: (i) is capable of supporting the propagation and amplification of an optical signal with X number of LP modes at a wavelength of 1550 nm wherein X is an integer greater than 1 and less than 10; and (ii) contains $Er_2O_3$ such that the average concentration of $Er_2O_3$ is at least 2 times lower in the portion of the core situated within $0 < r < 0.5R_1$ than the average concentration of $Er_2O_3$ in at least in one portion of the core with a width W of at least $0.1R_1$ that is situated in a portion of the core characterized by a center radius $r_c$ where $0.5R_1 > r_c > R_1$ wherein the portion of the core with a with a width W is doped with greater than 200 ppm of $Er_2O_3$. Preferably, the portion of the core with a with a width W is doped with greater than 500 ppm of $Er_2O_3$, and more preferably at least 700 ppm of $Er_2O_3$. Preferably, the radial width $W_d$ of the core portion doped with $Er_2O_3$ is at least $0.1R_1$. Preferably, the width W of the core portion doped with $Er_2O_3$ is at least $0.4R_1$, more preferably at least $0.5R_1$, and in some embodiment at least $0.75 R_1$.

It is noted that if the exemplary fiber embodiment disclosed herein is an Er doped fiber, unless otherwise specified herein, the above-referenced properties of the Er doped optical fiber disclosed herein and discussed below are measured or modeled at 1550 nm.

Figure 2A:
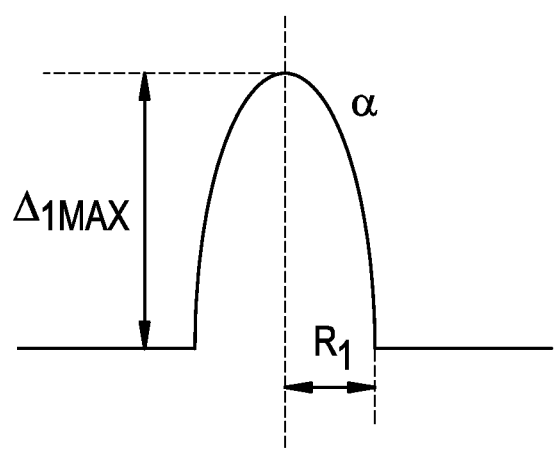
FIGS. 2A-2C are exemplary plots of the relative refractive index profiles of several exemplary optical fiber embodiments corresponding to FIG. 1.
Figure 2B:
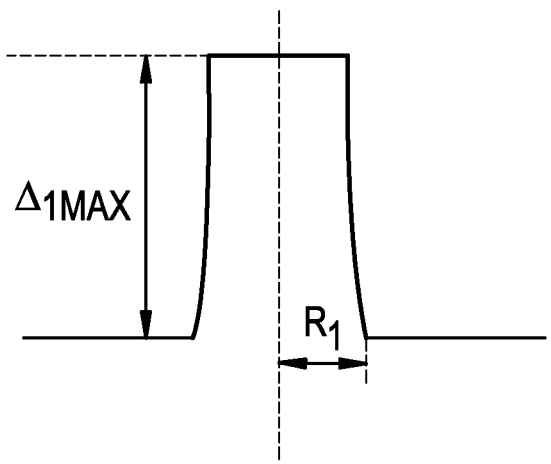
Figure 2C:
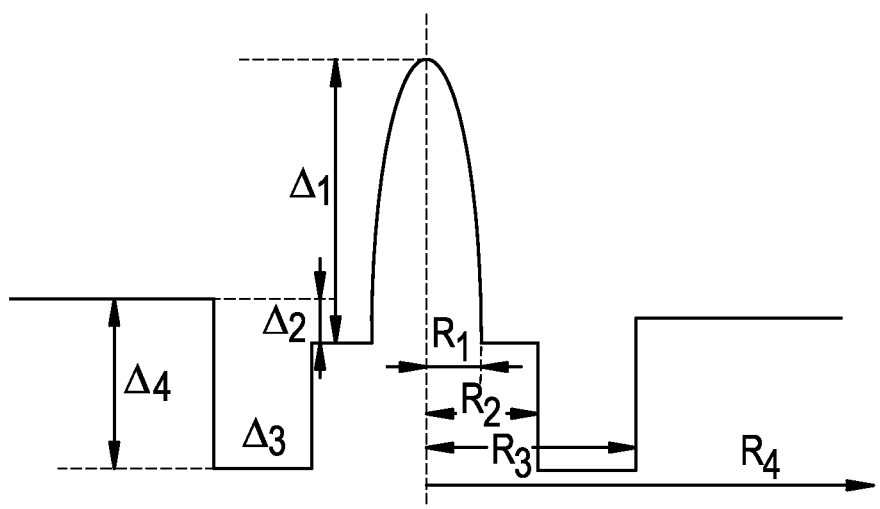

FIG. 1 is a schematic cross-sectional view of one embodiment of the few mode optical fiber ("fiber") 10 according to the disclosure. The various example embodiments of fiber 10 are now described below with respect to cross-sectional views of the fiber and plots of the corresponding refractive index profiles. FIG. 2A-2C illustrates an exemplary refractive index profiles of several example embodiments of fiber 10.

The optical fiber 10 is preferably a few moded fiber that comprises a few moded core 20 and a cladding 50. The cladding may be surrounded by one or more coatings (not shown). The core 20 propagates and amplifies more than 1 and no more than 10 optical modes (preferably no more than 7, and more preferably no more than 4 optical modes). For example, in some embodiments the core 20 supports the propagation and amplification of an optical signal with X number of LP modes at a wavelength at the amplification wavelength (e.g., 1550 nm), wherein X is an integer greater than 1 and not larger than 10, for example X=10, X=9, X=8, X=7, X=6, X=5, X=4, X=3, or X=2. That is, the core 20 does not support propagation of the modes with mode numbers corresponding to X>10. In some embodiments the core 20 does not support propagation the modes with mode numbers corresponding to X>6. For example, in the embodiments where X=3, the core 20 does not support greater than 3 optical modes. The disclosed few mode fiber (e.g., Er-doped fiber) is suitable for amplifying signals in a mode division multiplexed transmission system where each mode caries one or more independent signal channels. In principle, the larger the number of modes is, the more information capacity will be. But if the number of modes is too large, it is difficult to design modal division multiplexing/demultiplexing components to separate the modes. In addition, mode coupling among the modes becomes a problem. A number of modes between 2 and 10 is an optimum choice. Preferably the number of optical modes X is 2 to 5 or 6. In some of the embodiments the number of optical modes X is 2 to 4. The outer radius of the core 20 is $R_1$ and the outer radius of the cladding 50 is $R_4$. The core 20 may have a refractive index profile that is, for example, a step index profile, a profile that is essentially a step index profile, or a profile that is essentially parabolic.

Few moded transmission fibers (FMF) (i.e., fibers that are not doped with rare earth dopants) can be utilized, for example, in Mode Division Multiplexing, in order to increase capacity in transmission systems, by transmitting different signals in different propagating modes of the fiber. Optical fibers 10 are rare earth doped few moded fibers that can be optically coupled to the few moded transmission fiber to provide the needed optical amplification, in order to compensate for the loss of power in the transmission fiber and other components of the link. One advantage of the optical fibers 10 described herein is that they provide equalized or controlled gain for all optical modes used in the few mode transmission. Applicants discovered that because the propagation modes of the few mode fiber have different spatial distribution of the intensity in transverse direction, superior and unexpected gain equalization and/or gain control can be achieved by using non-uniform radial doping of an amplifier fiber core 20 by dopants responsible for optical amplification, for example, erbium ions. Applicants, while not wishing to be bound by theory, believe that this result is achieved via non-uniform distribution of the inverted ion population, which affects different optical modes differently.

Figure 3:
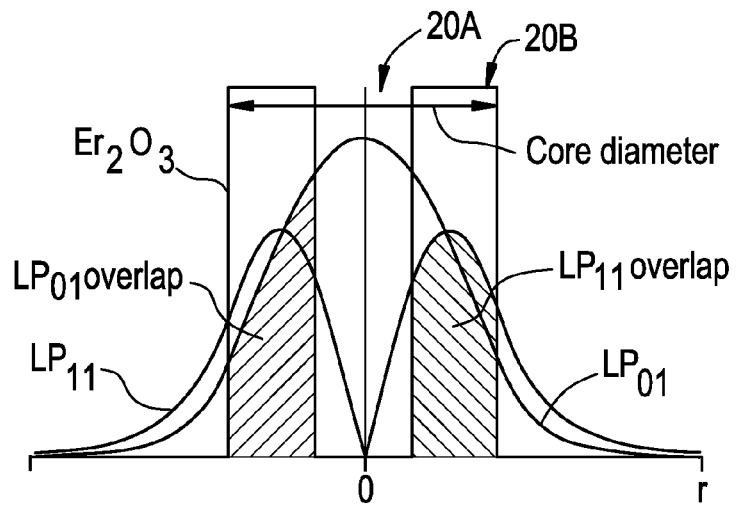
FIG. 3 illustrates schematically one exemplary distribution of Er dopant in a fiber core corresponding to FIGS. 2A and 2B, with Er concentration forming a step ring profile, as well as the LP01 and LP11 mode intensity distribution in the core of this fiber.

In some embodiments the core 20 is doped with $Er_2O_3$ for light amplification. One example of such doping in a few moded fiber 10 is illustrated in FIG. 3. More specifically, FIG. 3 illustrates an example of profile with step ring profile of Er concentration corresponding to the core portion 20B of the fiber core, as well as the LP01 and LP11 mode intensity distribution in the core of the optical fiber 10. Applicants discovered that in order to design a few moded fiber 10 (for example, such as Erbium doped fiber 10) one has several compositional parameters that preferably should be considered. More specifically, in order to reduce the likelihood of mode coupling, it is advantageous to reduce the length of the fiber 10. A reduced length optical fiber 10 can be achieved by doping the glass with a suitably high level of rare earth material, for example Er in the amount of 700 ppm or higher in one portion (portion 20B) of the fiber core 20. It is noted that the solubility of Erbium in pure silica or in $GeO_2$-doped silica is low, and if suitably high levels of Erbium are incorporated, the Er ions are not diffused through the glass uniformly, leading to undesirable Er-Er interactions and lower pumping efficiency. In order to increase the solubility of Er in the portion 20B of the core 20, and thus uniformity of Er distribution within the required portion of the fiber core, $Al_2O_3$ should be preferably incorporated in the glass as a fluxing agent to obtain a more uniform Er ion distribution. While relatively low levels of 1-3 Wt % of $Al_2O_3$ can serve this purpose, it is preferred to have 1) greater than 3 Wt % $Al_2O_3$ in order to influence the Er-ion environment which leads to a broader gain spectrum and 2) lower than 10 Wt % of $Al_2O_3$ due to crystallization issues with incorporation of higher $Al_2O_3$ levels.

In a silica based fiber 10, in order to obtain a few-moded fiber profile with the desired Delta versus radius through incorporation of index modifying dopants there is a preferred hierarchy of compositional allocation. It is preferable that in Er doped fibers, that first the appropriate level of $Er_2O_3$ has it's index contribution allocated, and the targeted level of $Al_2O_3$ should preferably have its index contribution allocated next. Last, the level of $GeO_2$ is allocated to result in the desired delta. If the desired delta is exceeded when desired levels of $Er_2O_3$ and $Al_2O_3$ are allocated, $GeO_2$ is not added at all, and instead F is added to lower the delta. Other combinations of up and down-dopants can be used in addition to the rare earth dopant in the fiber core. For example, non-uniform radial doping of an amplifier fiber core 20 provided a superior gain equalization/control.

Figure 4:
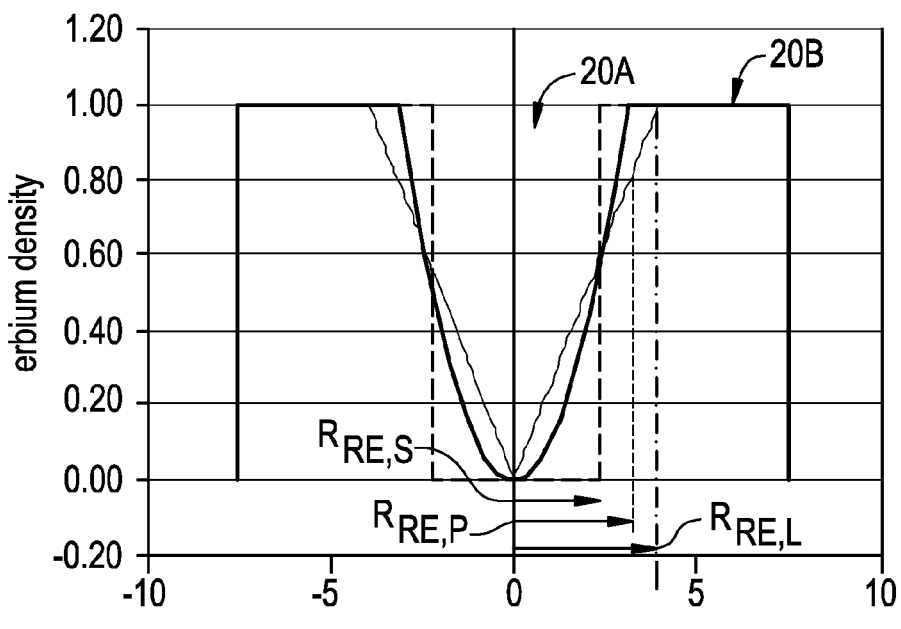
FIG. 4 illustrates three exemplary embodiments of rare earth doping within the fiber core.

According to some embodiments (see for example FIG. 3), rare earth (e.g., Er or Yb) concentration within the core 20 has an essentially rectangular-shaped "step" ring profile, with the rare earth doping concentration close to zero at or near the center of the fiber core 20. According to other embodiments the rare earth doping profiles have a decrease (for example a linear decrease) of doping density as the radius approaches zero (the center of the fiber core 20). According to some embodiments rare earth concentration profiles are parabolic in shape, with decrease of doping density as the core radius gets closer to r=0 (for example, the Er concentration being close to zero at the center of the fiber core 20). These rare earth dopant profiles provide modal gain equalization in erbium doped fiber amplifiers by controlling spatially dependent modal gain with the non-uniform distribution of the inversion, due to non-uniform concentration of rare earth dopant (for example Er, Yb) within the core 20. Examples of such rare earth concentration profiles are depicted, for example, in FIG. 4. More specifically, FIG. 4 illustrates three examples of rare earth doping: step doping, linearly decreasing doping (towards the core center) and parabolically decreasing doping (towards the core center). In each of these embodiments depicted in FIG. 4, the maximum concentration of rare earth occurs in the core region 20B (also referred to as a core portion 20B herein). FIG. 4 also illustrates that the inner radius $R_{RE}$ of the core region 20B varies, based on the rare earth concentration profile. For example, FIG. 4 illustrates that the radius $R_{RE,S}$ for the step doping rare earth concentration profile (and no rare earth in portion 20A of the core 20) may be smaller than the radius $R_{RE,P}$ that corresponds to the fiber with parabolic rare earth dopant profile in region 20A (also referred to as a core portion 20A herein), which is in turn smaller than the radius $R_{RE,L}$ that corresponds to the fiber with linear rare earth dopant profile in region 20A. Because core region 20B corresponds to the location of the maximum intensity of higher order modes, these modes are amplified more effectively (e.g., stronger) such that equal gain between these modes and the fundamental mode that has lower intensity in the core region 20B can be advantageously achieved. In some embodiments, the higher order modes are amplified stronger than the fundamental mode in order to provide compensation for splicing losses, because higher order modes tend to have stronger splice losses. For example, in some embodiments of the optical fiber 10, the rare earth concentration profile in the core is designed such that the fiber gain for the signals propagating in the LP11 mode is higher than that for the signals propagating in LP01 mode. Similarly, linearly decreasing rare earth doping (towards the core center) and parabolically decreasing rare earth doping (towards the core center) also amplifies higher order modes more effectively than the fundamental mode, such that equal gain for all propagating optical modes can be advantageously achieved. Furthermore, if one mode tends to be more lossy than other optical modes in propagation or incurs higher splice losses, higher rare earth concentrations situated in a core location(s) corresponding to such mode maximum intensity can advantageously provide gain control such that such loss is compensated, and the overall gain is maintained at about the same level as other modes including the fundamental mode. Thus, applicants discovered that unequal doping of rare earth materials within the core (uneven distribution of rare earth dopant(s)) as taught herein can provide superior gain control in optical fiber amplifiers, or in fiber lasers.

According to some embodiments a few moded optical fiber 10 comprises: the glass core 20 having a radius $R_1$ from about 3 μm to about 15 μm, a maximum relative refractive index delta $\Delta_{1MAX}$ from about between 0.3% to 2% relative to the glass cladding, and refractive index profile of the core is structured such that the core is capable of supporting the propagation and transmission of an optical signal with X number of LP modes at a wavelength of 1550 nm wherein X is an integer greater than 1 and less than 10 (preferably 1<X≤5), and an effective area of LP01 mode between 20 μm² and 200 μm² at 1550 nm. In some embodiments the core 20 contains a gain producing dopant, preferably a rare earth dopant, for example Er, such that the average concentration of this dopant (e.g., Er) is at least 1.5 times lower (and preferably 1.7 times, or 2 times lower) in the portion of the core situated within $0<r<0.3R_1$ than the average concentration of this dopant in at least in one portion of the core with a width W of at least 1 μm that is situated in a portion of the core characterized by a center radius $r_c$, where $0.3R_1 > r_c > R_1$. In some embodiments the core 20 contains a gain producing dopant, preferably a rare earth dopant, for example Er, such that the average concentration of this dopant (e.g., Er) is at least 1.5 times lower (and preferably 1.7 times, or 2 times lower) in the portion of the core situated within $0<r<0.5R_1$ than the average concentration of this dopant in at least in one portion of the core with a width W of at least 1 μm that is situated in a portion of the core characterized by a center radius $r_c$, where $0.5R_1 > r_c > R$.

In some embodiments the core 20 contains a gain producing dopant, preferably a rare earth dopant, for example Er, such that the average concentration of this dopant (e.g., Er) is at least 1.5 times lower (and preferably 1.7 times, or 2 times lower) in the portion of the core situated within $0<r<0.5R_1$ than the average concentration of this dopant in at least in one portion of the core with a width W of at least $0.1R_1$ (and preferably of at least $0.2R_1$) that is situated in a portion of the core characterized by a center radius $r_c$, where $0.5R_1 > r_c > R$. If Er is being utilized, it is preferable that this portion of the core is doped with greater than 300 ppm of $Er_2O_3$. The glass cladding 50 surrounds and is in direct contact with the glass core 20, and comprises a maximum relative refractive index delta respect to pure silica ($\Delta_{4MAX}$) and $\Delta_{1MAX} > \Delta_{4MAX}$.

Other rare earth dopants may also be utilized, for example: Yb, Nd, Tm, Sm, Gd, Pr, or Tb. Thus, according to some embodiments the optical fiber 10 is doped with one of the rare dopants such as Er, Nd, Tm, Sm, Gd, Pr, or Tb and preferably has its amplification or gain wavelength situated in one of the following wavelength bands: 625-640 nm, 940-1080 nm, 1280-1360 nm, 1440-1490 nm, 1490-1520 nm, 1530-1570 nm, 1620-1670 nm. For example, if Yb is utilized, the refractive index profile of the few moded Yb doped fiber can be similar to that shown FIG. 2A, 2B or 2C, with more Yb is utilized in portion 20B of the core than in portion 20A of the fiber core, and Yb concentration is 300 to 2000 ppm (for example 800 ppm to 1200 ppm). In some embodiments the core 20 contains both Yb and Er. Concentration profiles of Yb in the fiber core can be similar to the profiles shown in FIG. 4.

According to some embodiments the optical fiber 10 comprises a glass core 20 having a radius $R_1$, and 3 μm≤$R_1$≤15 μm, a maximum relative refractive index delta $\Delta_{1MAX}$ relative to the glass cladding, and 0.3%≤$\Delta_{1MAX}$≤2%, and refractive index profile of the core is structured such that the core is capable of supporting the propagation and transmission of an optical signal with X number of LP modes at a wavelength of 1550 nm wherein X is an integer greater than 1 and less than 10 (i.e., it does not support more than 10 LP modes), and an effective area of LP01 mode between 20 μm² and 200 μm² at 1550 nm. In some embodiments, the core contains a non-uniform concentration of Er, such that Er concentration in a region (or portion) of the core adjacent to the core's center is smaller than Er concentration in a region (or portion) of the core of at least 1 μm width that is situated within $0.3R_1 < r < R_1$ and, and this region of the core of at least 1 μm width is doped with greater than 300 ppm of $Er_2O_3$. In some embodiments, the core contains a non-uniform concentration of Er, such that Er concentration in a region (or portion) of the core adjacent to the core's center is smaller than Er concentration in a region (or portion) of the core with a width of at least $0.1R_1$ and that is situated within $0.3R_1 < r < R_1$ and, and this region of the core of at least 1 μm width is doped with greater than 300 ppm of $Er_2O_3$. According to some embodiments Er dopant concentration within at a portion of the core 20A increases linearly or parabolically, and in some embodiments it is abruptly stepped and is ring-shaped. Depending upon the targeted profile shape the remaining delta contribution should be filled by a suitable index modifying dopant, for example $Al_2O_3$ and/or $GeO_2$ (if delta needs to be increased), or a down dopant if core delta needs to be decreased. More specifically, for use as a downdopant, Fluorine is the preferred dopant due to Boron creating absorption in the Erbium emission wavelength range. For updopant use of $GeO_2$ is preferred as it has minimal impact on the Er emission spectrum and is readily available in most silica fiber making facilities. As mentioned above, the use of $Al_2O_3$ is also preferred to allow better solubility of the rare earth dopant. In some embodiments of the optical fiber 10 $GeO_2$ and $Al_2O_3$ (i.e., the core 20 is co-doped with these materials) are used together to achieve the desired core delta. In some embodiments the core contains $GeO_2$ and $Al_2O_3$ and $P_2O_5$, and in some embodiments the core 20 contains $GeO_2$ and $Al_2O_3$ and F. One of skill in the art of fiber making will recognize that other updopants (Ti, Cl, Ga, Zr, Nb, Ta etc.) can also be utilized, as long as the impact on rare earth emission is factored in to the design. The doping concentration of $Er_2O_3$ in at least one region 20B of the core 20 (where region 20B is situated within a portion of the core corresponding to $r>0.3R_1$) is preferably greater than 300 ppm, more preferably greater than 500 ppm, even more preferably greater than 700 pmm and less than 5000 ppm (for example 1000 ppm to 3000 ppm, or 1000 to 1500 ppm). Preferably, $Al_2O_3$ is added to at least the core region 20B of the core 20 and/or to disperse Er uniformly throughout this region, in order to minimize potentially harmful interactions between Er ions, and/in order to increase the amplification bandwidth. Preferably the concentration of $Al_2O_3$ in region 20B is greater than 0.5 wt %, more preferably greater than 2%, and even more preferably between 6 and 10%.

One exemplary refractive index profile of core 20 is shown schematically in FIG. 2A. The shape of the core's refractive index profile depicted in FIG. 2A can be described by α-profile. The core index profile can be a step profile (α>10) or a graded index profile (α<10). For example, in an embodiment with a graded index core, the alpha value may be greater than or equal to about 1.8 and less than or equal to about 2.2 at a wavelength of 1550 nm. To achieve a desired relative refractive index increase in the core, $GeO_2$ can be added to the core 20. The concentration of $GeO_2$ to the core 20, if $GeO_2$ is utilized is preferably is of 5 to 25 wt %, more preferably between 10 to 25 wt %. The core delta is between 0.3 to 25%, more preferably between 0.4 to 1.5% (e.g., 0.6%, 0.7%, 0.8%, 1%, 1.25%, or therebetween), relatively to the glass cladding. The core radius $R_1$ is in the range of 3 $\mu m \le R_1 \le 15$ $\mu m$. In this exemplary embodiment the core radius $R_1$ is selected according to the core delta to support at least two modes (i.e., X=2) at 1550 nm wavelength. Preferably the cutoff of the LP11 mode is greater than 1850 nm. In the following exemplary embodiments the cutoff wavelength of the LP11 mode is greater than 1850 nm least and less than 3300 nm. Preferably, the cutoff of the LP11 mode is greater 2000 nm, for example 2000 to 2500 nm. The numerical aperture NA of the few moded optical fiber 10 is greater than 0.05 and less than 0.3, for example between 0.09 and 0.24, or between 0.1 and 0.22, or between 0.15 and 0.2. An effective area of the LP01 mode may be between about 20 $\mu m^2$ for higher core delta (e.g., 20 $\mu m^2$, 30 $\mu m^2$, 40 $\mu m^2$ or any number therebetween) and about 200 $\mu m^2$ (for the lower core deltas). For example the effective area of the LP01 mode may be between 20 $\mu m^2$ and 170 $\mu m^2$, or between 25 $\mu m^2$ and 140 $\mu m^2$, or between 50 and 100 $\mu m^2$.

Another embodiment of core profile design is shown schematically in FIG. 2C. As shown in this figure, in this embodiment the glass cladding includes a low index ring layer 53 and an optional inner cladding layer 52 surrounding and in direct contact with the few-moded glass core 20. In this embodiment, the core 20 is doped with a rare earth dopant as shown in FIG. 4. The inner cladding layer 52 may have a relative refractive index $\Delta_2$ such that $\Delta_{1MAX} \ge \Delta_2$, where $\Delta_{1MAX}$ is the maximum refractive index delta of the core 20 (relative to the outer cladding) and $\Delta_2$ is the refractive index delta of the inner cladding layer 52. As defined herein, in the embodiments that have a narrow center line spike or center line dip, $\Delta_{1MAX}$ is measured outside this spike, i.e., at a distance of about 0.5 $\mu m$ from the center line. A low index ring 53 may surround and directly contact the inner cladding layer, or alternatively may surround and directly contact the core 20. Preferably, the low index ring 53 has a minimum relative refractive index delta $\Delta_{ring\,MIN}$ of less than −0.1%; for example less than −0.25%, or less than −0.3%. In some embodiments −0.6%<$\Delta_{ring\,MIN}$<−0.1%, for example −0.6%<$\Delta_{ring\,MIN}$<−0.2%, or −0.5%<$\Delta_{ring\,MIN}$<−0.2%. The outer cladding layer 54 may surround and directly contact the low index ring. The low index ring 53 has a minimum relative refractive index $\Delta_{3MIN}$ relative to the outer cladding layer and the outer cladding layer 54 has a maximum relative refractive index $\Delta_{4MAX}$ relative to pure silica glass such that $\Delta_{1MAX} > \Delta_{4MAX} > \Delta_{3MIN}$. In this embodiment, a low index ring 53 is placed between the central core 20 and the cladding layer 54. The core is similar to the core design described above in FIG. 2A. As described above, the ring 53 can be adjacent to the central core 20 (not shown) or has a space offset from the central core, as shown in FIG. 2B. The offset $R_2 - R_1$ (the width of the inner cladding layer 52) is between 0 to 15 $\mu m$. The relative refractive index delta $\Delta_3$ of the ring layer 53 is between −0.15 to 0%. In the embodiment shown in FIG. 2B the low index ring 53 has a starting radius of $R_2$ and an ending radius $R_3$. The low index ring has an index change of $\Delta_{3MIN}$, and a ring width W of $R_3 - R_2$. It can be made of glass doped with a index decreasing dopant such as F, or B. Preferably $\Delta_{3MIN}$ is between −0.1 and −0.7%, more preferably between −0.3 and −0.5%. The ring width W is preferably between 2 to 8 $\mu m$, more preferably between 4 to 6 $\mu m$. In this embodiment the cross-section of the refractive index profile of the low index ring 53 is rectangular, but the relative refractive index profile of the low index ring can be of other shapes, like triangular or parabolic for additional mode-field control in the fiber design.

Tables 1 and 2 provide parameters for eleven modeled profile examples of the optical fiber 10. Examples 1-9 have a simple core design as shown in FIGS. 2A and 2B, Examples 10-11 have a profile with core and a low index ring. Examples 1-8 have a step index core, while Examples 9-11 have a graded index core. In each of these exemplary embodiments most of the $Er_2O_3$ dopant was situated within the portion 20B (of the core 20) with an inner radius $R_{RE}$, and an outer radius $R_1$ and the Er concentration was "step-doped" in the shape of the step. This doping profile allowed the signal gain in LP01 mode to be the same as the signal gain in the LP11 mode.

TABLE 1

| | Example | | | | | | |
|---|---|---|---|---|---|---|---|
| | 1 | 2 | 3 | 4 | 5 | 6 | 7 |
| $\Delta_{1MAX}$ (%) | 0.34 | 0.5 | 0.75 | 1 | 1.5 | 2 | 0.3 |
| $Er_2O_3$ (ppm) | 500 | 600 | 700 | 800 | 1000 | 1500 | 800 |
| $Al_2O_3$ (wt %) | 4.1 | 6.0 | 8.4 | 9.0 | 10.4 | 7 | 3.6 |
| $GeO_2$ (wt %) | 0 | 0 | 0.75 | 4.0 | 4.7 | 22 | 0 |
| $R_{RE}$ ($\mu m$) | 3.4 | 2.9 | 2.4 | 2.0 | 1.7 | 1.4 | 4.0 |
| $R_1$ ($\mu m$) | 7 | 6.5 | 5.8 | 5 | 4 | 3 | 10.5 |
| α | 200 | 200 | 200 | 200 | 200 | 200 | 20 |
| $\Delta_2$ (%) | 0 | 0 | 0 | 0 | 0 | 0 | 0 |
| $R_2$ ($\mu m$) | n/a | n/a | n/a | n/a | n/a | n/a | n/a |
| $\Delta_3$ (%) | 0 | 0 | 0 | 0 | 0 | 0 | 0 |
| $R_3$ ($\mu m$) | n/a | n/a | n/a | n/a | n/a | n/a | n/a |
| $\Delta_4$ (%) | 0 | 0 | 0 | 0 | 0 | 0 | 0 |
| Number of modes | 5 | 7 | 8 | 8 | 8 | 6 | 10 |
| LP11 cutoff ($\mu m$) | 2.150 | 2.423 | 2.653 | 2.647 | 2.604 | 2.266 | 2.894 |
| MFD ($\mu m$) | 12.6 | 11.1 | 9.6 | 8.3 | 6.7 | 5.3 | 16.1 |
| Aeff ($\mu m^2$) | 133.6 | 106.7 | 80.7 | 60.0 | 38.7 | 23.6 | 230.1 |

TABLE 2

| | Example | | | |
|---|---|---|---|---|
| | 8 | 9 | 10 | 11 |
| $\Delta_1$ (%) | 0.6 | 0.9 | 1.4 | 1.2 |
| $Er_2O_3$ (ppm) | 900 | 2000 | 1300 | 3000 |
| $Al_2O_3$ (wt %) | 7.2 | 7 | 9 | 7 |
| $GeO_2$ (wt %) | 0 | 5.2 | 10.2 | 10.0 |
| $R_{RE}$ ($\mu m$) | 2.7 | 2.8 | 2.0 | 2.1 |

TABLE 2-continued

| | Example | | | |
|---|---|---|---|---|
| | 8 | 9 | 10 | 11 |
| $R_1$ (μm) | 6.5 | 8.2 | 6 | 6 |
| α | 10 | 2 | 2.5 | 3 |
| $\Delta_2$ (%) | 0 | 0 | 0 | 0 |
| $R_2$ (μm) | n/a | n/a | 8 | 7.5 |
| $\Delta_3$ (%) | 0 | 0 | −0.2 | −0.5 |
| $R_3$ (μm) | n/a | n/a | 18 | 11.5 |
| $\Delta_4$ (%) | 0 | 0 | 0 | 0.1 |
| Number of mode | 7 | 10 | 9 | 9 |
| LP11 cutoff (um) | 2.423 | 2.819 | 2.582 | 2.217 |
| MFD (μm) | 10.2 | 9.2 | 7.2 | 7.6 |
| Aeff (μm²) | 87.5 | 65.6 | 40.8 | 46.2 |

FIGS. 5A and 5B illustrate modeling results for different embodiments of optical fiber 10 with an Er doped core and step index core profile similar to that is shown in FIG. 2B. In these examples, the gain is measured at the operating or gain wavelength of 1550 nm, and the pump light is propagating in the core 20 in the fundamental mode (LP01) at the pump wavelength λp (λp=980 nm for FIGS. 5A and 5B, left side, and λp=1480 nm for FIGS. 5A and 5B, right side). The core's Er concentration profiles are similar to the three types of rare earth dopant concentration profiles shown in FIG. 4. More specifically, FIG. 5A corresponds to a few moded fiber 10 that has an step index core profile with a maximum refractive index delta $\Delta_{1max}$ of 0.85% and the core radius $R_1$=4 μm. FIG. 5A (left hand side) shows the modeling results of the Er doped optical fiber 10 when it is pumped with a 0.98 μm pump, while the right hand side of FIG. 5A corresponds to the same Er doped optical fiber 10 when it is pumped with a 1.48 μm pump. The vertical axis of the graphs depicts gain in units of normalized density of excited states ($N(1/cm^3)$=$K(1/cm)/\sigma$ ($cm^2$), where N is the density of excited states, K is the gain per unit length, and σ is the stimulated emission cross-section), while the horizontal axis shows the radius $R_{RE}$, in microns (i.e., the inner radius of the core portion 20B). FIG. 5A illustrates that when the optical fiber with a step doping concentration profile is utilized (i.e., essentially no Er dopant in fiber core portion 20A), for cases when optical pump wavelength is 0.98 μm equal gain can be achieved for signals propagating/transmitted in LP01 and LP11 modes when $R_{RE}$ ~2 μm. Similarly, in the case when the Er concentration profile is parabolically decreasing in the fiber section 20A (with no or minimum amount of Er being at the center) for cases when optical pump wavelength is 0.98 μm, equal gain can be achieved for signals propagating/transmitted in LP01 and LP11 optical modes when $R_{RE}$ ~3.5 μm. However, in the case when the Er concentration profile is linear in the fiber section 20A (with no or minimum amount of Er being at the center) for cases when optical pump wavelength is 0.98 μm, nearly equal gain can be achieved for signals propagating/transmitted in LP01 and LP11 optical modes only when $R_{RE}$ is close in value to $R_1$. Thus, FIG. 5A illustrates that the exemplary fiber embodiment (with linearly decreasing doping in section 20A) is not as effective for equalizing gain of the signals transmitted in LP01 and LP11 optical modes at signal wavelength of 1550 nm as the fiber embodiments with a step ring in portion 20B of the core or the fiber embodiment with a nearly parabolic Er concentration profile in portion 20A of the fiber core. However, this figure also illustrates a large improvement of having this fiber configuration (linearly decreasing doping in section 20A) versus a comparative fiber with a uniform rare earth dopant concentration throughout the core, because the difference in gain in LP01 and LP11 modes provided by this fiber embodiment is much smaller than that in a similar doped fiber that has a uniform rare earth doping throughout the core.

FIG. 5A (right hand side) also illustrates that when the optical fiber with a step doping concentration profile is utilized (i.e., essentially no Er in fiber core portion 20A), for cases when optical pump wavelength is 1.48 μm equal gain can be achieved for signals propagating/transmitted in LP01 and LP11 modes when $R_{RE}$ is about 1.8 μm. Similarly, in the case when the Er concentration profile is parabolically decreasing in the fiber section 20A (with no or minimum amount of Er being at the center) for cases when optical pump wavelength is 1.48 μm, equal gain can be achieved for signals propagating/transmitted in LP01 and LP11 optical modes when $R_{RE}$ ~2.5 μm (i.e., in this embodiment equalizing radius $R_E$=2.5 μm). However, in the case when the Er concentration profile is linear in the fiber section 20A (with no or minimum amount of Er being at the center) for cases when optical pump wavelength is 1.48 μm, nearly equal gain can be achieved for signals propagating/transmitted in LP01 and LP11 optical modes only when $R_{RE}$ is close in value to $R_1$ (however, this fiber embodiment does not fully equalizes LP01 and LP11 gain).

FIG. 5B is similar to FIG. 5A, because it also corresponds to a fiber with a Er doped core with a step-shaped refractive index profile. However, FIG. 5B corresponds to a few moded fiber 10 that has an step index core profile with a maximum refractive index delta $\Delta_{1max}$ of 0.5% and the core radius $R_1$=6 μm. FIG. 5B (left hand side) shows the modeling results of the Er doped optical fiber 10 when it is pumped with a 0.98 μm pump, while the right hand side of FIG. 5B corresponds to the same Er doped optical fiber 10 when it is pumped with a 1.48 μm pump. FIG. 5B illustrates that when the optical fiber with a step doping concentration profile is utilized (i.e., essentially no Er dopant in fiber core portion 20A), for cases when optical pump wavelength is 0.98 μm, equal gain can be achieved for signals propagating/transmitted in LP01 and LP11 modes when $R_{RE}$ is about 2.3 μm. Similarly, in the case when the Er concentration profile is parabolically decreasing in the fiber section 20A (with no or minimum amount of Er being at the center) for cases when optical pump wavelength is 0.98 μm, equal gain can be achieved for signals propagating/transmitted in LP01 and LP11 optical modes when $R_{RE}$ ~3.7 μm. In the case when the Er concentration profile is linearly decreasing in the fiber section 20A (with no or minimum amount of Er being at the center) for cases when optical pump wavelength is 0.98 μm, nearly equal gain (at the operating or gain wavelength of 1550 nm) can be achieved for signals propagating or transmitted in LP01 and LP11 optical modes at larger $R_{RE}$ values, for example when $R_{RE}$>4 μm.

FIG. 5B (right hand side) also illustrates that when the optical fiber with a step doping concentration profile is utilized (i.e., essentially no Er in fiber core portion 20A), for cases when optical pump wavelength is 1.48 μm equal gain can be achieved for signals propagating/transmitted in LP01 and LP11 modes when $R_{RE}$ is about 2.2 μm. In the case when the Er concentration profile is parabolically decreasing in the fiber section 20A (with no or minimum amount of Er being at the center) for cases when optical pump wavelength is 1.48 μm, equal gain can be achieved for the 1550 nm signals propagating/transmitted in LP01 and LP11 optical modes when $R_{RE}$ ~2.4 μm. In the case when the Er concentration profile is linearly decreasing in the fiber section 20A (with no or minimum amount of Er being at the center) for cases when optical pump wavelength is 1.48 μm, equal gain can be achieved for signals propagating/transmitted in LP01 and LP11 optical modes when $R_{RE}$ is about 4.5 μm.

Figure 5C:
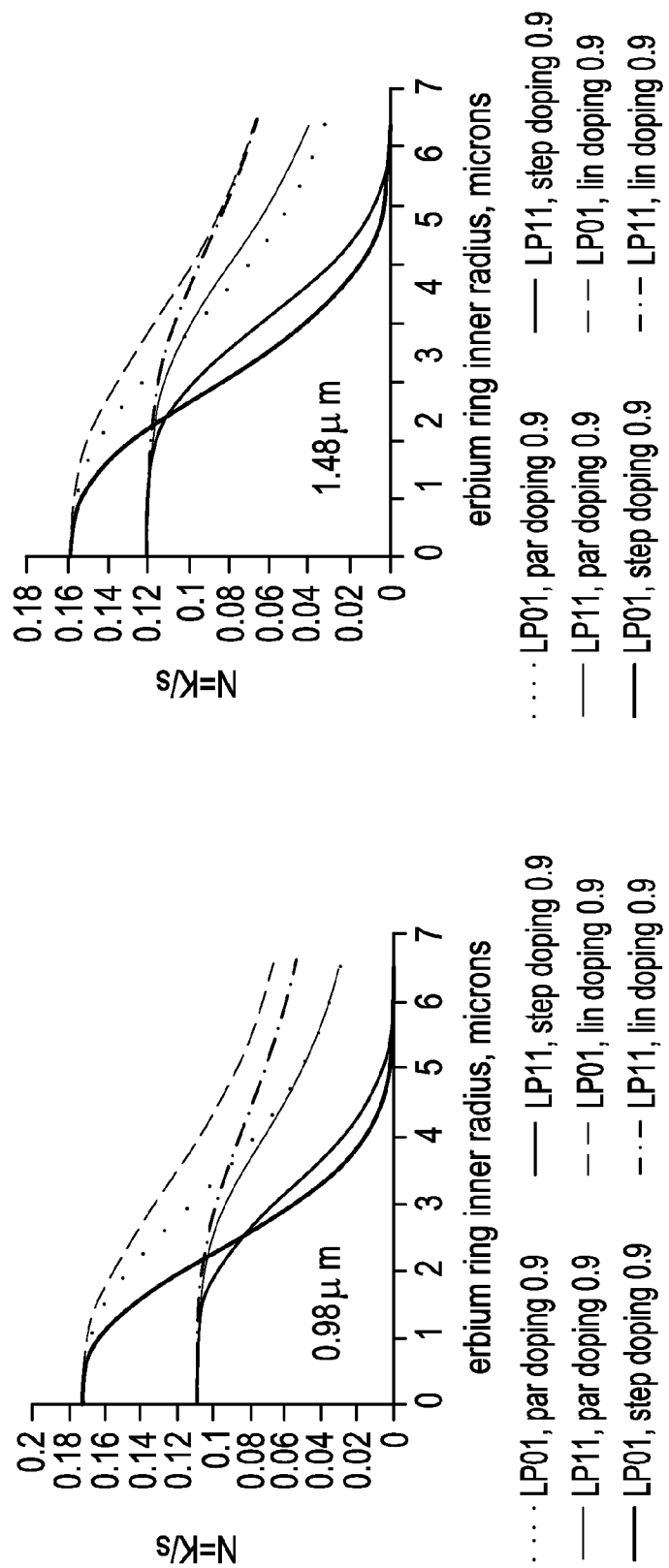

FIG. 5C illustrate modeling results for different embodiments of optical fiber 10 with a graded refractive index profile similar to that is shown in FIGS. 2A and 2C, and with 3 different dopant profiles similar to those shown in FIG. 4.

FIG. 5C corresponds to a few moded fiber 10 with a Er doped core with an alpha profile where α=2, the maximum refractive index delta $\Delta_{1max}$ of 0.5% and the core radius $R_1$=7.5 µm. FIG. 5C (left hand side) shows the modeling results of the Er doped optical fiber 10 when it is pumped with a 0.98 µm pump, while the right hand side of FIG. 5C corresponds to the same Er doped optical fiber 10 when it is pumped with a 1.48 µm pump. FIG. 5C, (left hand side) illustrates that for cases when optical pump wavelength is 0.98 µm, and step doping concentration profile is utilized (e.g., essentially no Er in at least one section of the fiber core portion 20A) equal gain can be achieved for signals propagating/transmitted in LP01 and LP11 modes when $R_{RE}$ is about 2.8 µm. Similarly, in the case when the Er concentration profile is parabolically decreasing in the fiber section 20A (with no or minimum amount of Er being at the center) for cases when optical pump wavelength is 0.98 µm, equal gain can be achieved for signals propagating/transmitted in LP01 and LP11 optical modes when $R_{RE}$ is about 5.5 µm. The embodiment of the optical fiber doping profile with linearly decreasing Er concentration in section 20A is does not provide equal gain to the signals propagating in LP01 and LP11 modes, but it controls the gain so that the difference in signal gain between these optical modes is not large (e.g., when $R_{RE}$>5 µm). FIG. 5C (right hand side) also illustrates that when the optical fiber with a step doping concentration profile is utilized (i.e., essentially no Er in fiber core portion 20A), for cases when optical pump wavelength is 1.48 µm, equal gain can be achieved for signals propagating/transmitted in LP01 and LP11 modes when $R_{RE}$ is about 2.5 µm. In the case when the Er concentration profile is parabolically decreasing in the fiber section 20A (with no or minimum amount of Er being at the center) for cases when optical pump wavelength is 1.48, equal gain can be achieved for the 1550 nm signals propagating/transmitted in LP01 and LP11 optical modes when $R_{RE}$ ~3.5 µm. In the case when the Er concentration profile is linear in the fiber section 20A (with no or minimum amount of Er being at the center) for cases when optical pump wavelength is 1.48, equal gain can be achieved for signals propagating/transmitted in LP01 and LP11 optical modes when $R_{RE}$ is about 6 µm or greater.

Figure 6:
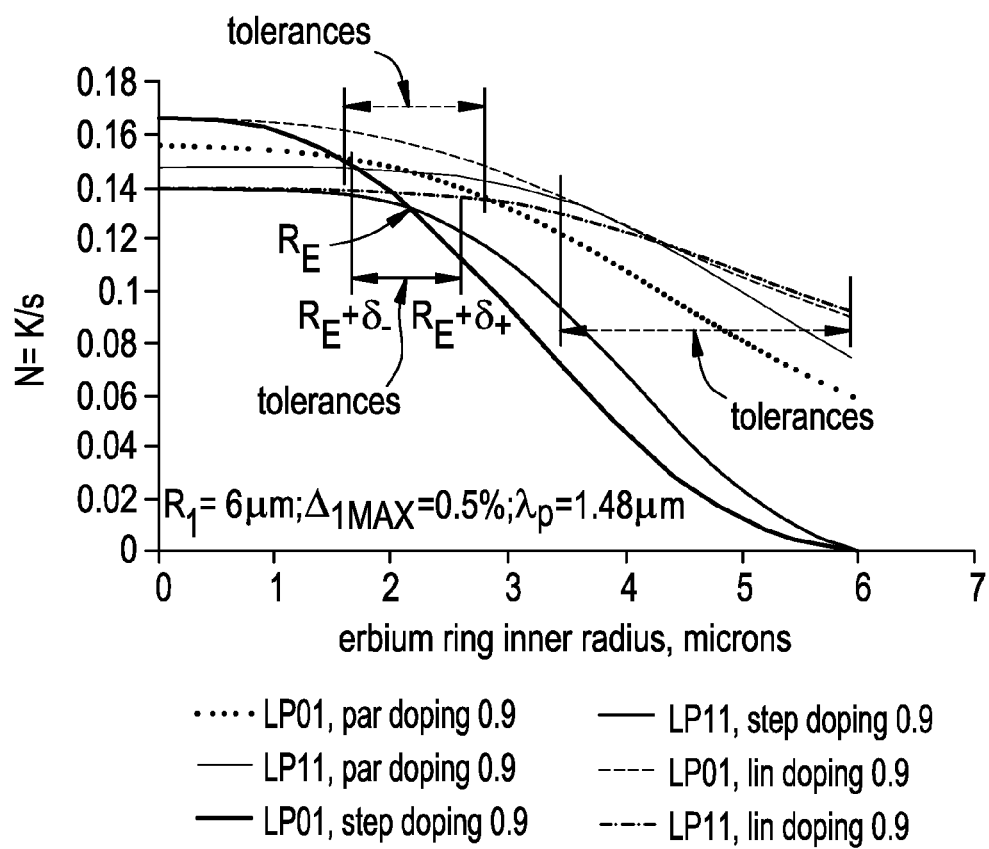
FIG. 6 illustrates tolerances on the $R_{RE}$ value for equalization of modal gain between LP01 and LP11 modes within 10% of each other, as determined from numerical modeling.

FIG. 6 shows an expanded view of the right side of FIG. 5B. That is, the few moded fiber corresponding to FIG. 6 has a step index core profile with a maximum refractive index delta $\Delta_{1max}$ of 0.5% and the core radius $R_1$=6 µm, and the fiber is pumped with a 1.48 µm pump. In the case when the optical fiber embodiment with a step doping concentration profile and essentially no Er in fiber core portion 20A, equal gain (at the operating, or signal wavelength) can be achieved for signals propagating/transmitted in LP01 and LP11 modes when $R_{RE}$ is about 2.2 µm. In the case when the Er concentration profile is parabolically decreasing in the fiber section 20A (with no or minimum amount of Er being at the center), equal gain can be achieved for the 1550 nm signals propagating/transmitted in LP01 and LP11 optical modes when $R_{RE}$ ~2.4 µm. In the case when the Er concentration profile is linear in the fiber section 20A (with no, or minimum amount of Er being at the center) for cases when optical pump wavelength is 1.48 µm, equal gain can be achieved for signals propagating/transmitted in LP01 and LP11 optical modes when $R_{RE}$ is about 4.5 µm. FIG. 6 also illustrates that one can have relatively broad tolerances for the $R_{RE}$ values, and still achieve nearly equal amplification for the signals propagating through optical fiber 10 in LP01 and LP11 optical modes (in this embodiment for 1550 nm signals). For example, FIG. 6 illustrates that in order to keep amplification (i.e., gain) of LP01 and LP11 within 10% of one another, when Er is situated only within core portion 20B (with no Er being at the core portion 20A), $R_{RE}$ can be about 2.0 to about 2.4 µm. Similarly, in case of parabolically decreasing Er concentration shape within core portion 20A, in order to keep amplification (i.e., gain) of LP01 and LP11 within 10%, $R_{RE}$ should be between 1.8 µm and 2.8 µm. Similarly, in case of linear Er concentration profile within core portion 20A (with no Er in the center), in order to keep amplification (i.e., gain) of LP01 and LP11 within 10%, $R_{RE}$ should be between about 3.7 µm and nearly 6 µm.

Since the few moded optical fiber 10 supports X LP modes at the signal wavelength, it is also supporting at least X (or more) LP modes at the pump wavelength (since the pump wavelength is always shorter). Therefore, it is noted that the few moded optical fiber 10 may also be pumped such that the pump light propagates within the optical fiber 10 in both LP01 and LP11 modes of the pump, with some amount of power $P_{01}$ in LP01 mode of the pump and some other amount of power $P_{11}$ in LP11 mode of the pump. The ratio $P_{01}:P_{11}$ of these powers, as well as pump wavelength can affect the optimum position of the doping ring's inner radius $R_{RE}$ (i.e., the inner radius of the core portion 20B) and the range of $R_{RE}$ values (tolerances) that result in gain or amplification between the LP01 and LP11 modes being within 10% of one another (i.e., essentially equal gain for these modes). More specifically, Table 3, summarizes the geometry of the core's relative refractive index profile ($R_1$ and α values), the maximum refractive index delta $\Delta_{1MAX}$ of the core (with respect to the cladding); the α-parameter of the refractive index profile of the core (α=2 for graded index profile and α=∞ for step index), the wavelength $\lambda_p$ (in µm) of the pump light, the ratio of $P_{01}:P_{11}$ for powers of the pump modes, and the shape of the Er concentration profile (e.g., step doping with no Er in core portion 20A, or linear in core portion 20A with minimum Er amount situated at or adjacent to the core center). The optical fiber 10 of Table 3 was pumped either at 980 nm, or at 1480 nm wavelengths and either mostly with LP01 mode of the pump ($P_{10}:P_{11}$=9:1), mostly with LP11 mode of the pump ($P_{01}:P_{11}$=1:9) or with equal power in the pump modes ($P_{01}:P_{11}$=1:1). The value of $R_E$ listed in the table for step and linearly decreasing doping profiles in the core portion 20B is the radius of modal gain equalization, meaning the value of $R_{RE}$ that provides exactly equal calculated gain for LP01 and LP11 modes of the signal. The symbols $\delta_+$ and $\delta_-$ represent the deviation of the inner radius $R_{RE}$ of the core portion 20B from that "exactly equalizing" value of $R_E$ which results in 10% difference in modal gain between LP01 and LP11 modes of the signal. For example, for the few moded optical fiber example of Table 3 with $R_1$=7.5 µm, $\Delta_{1MAX}$=0.5%, graded index core with α=2 that is pumped with two pump modes of equal power ($P_{01}:P_{11}$=1:1), the value $R_{RE}$ that results in the equal gain for the LP01 and LP11 optical modes at the signal/operation wavelength $\lambda_S$ (also referred to as the amplification wavelength herein) of 1550 nm n is 2.5 µm (i.e, $R_{RE}$=$R_E$=2.5 µm). For this example, $\delta_+$=0.3 and $\delta_-$=−0.2, which means that the preferable range for $R_{RE}$ values that result in 10% or less gain difference between LP01 and LP11 modes of the signal is from 2.3 µm to 2.8 µm. The preferable $R_{RE}$ range for the same fiber can be expanded (i.e., the tolerances for the $R_{RE}$ value can be looser) if the pump with $P_{01}$ to $P_{11}$ ratio of 9:1 was utilized. For this example, $R_{RE}$=2.8 µm provides exactly equal gain for the LP01 and LP11 modes of the signal (i.e., in this embodiment when $R_{RE}$=2.8 µm, $R_{RE}$=Re). However, in this case $\delta_+$41.7 and $\delta_-$=−0.3 which means that the gain difference between LP01 and LP11 modes of the signal will be less than 10% as long as $R_{RE}$ values are between 2.5 µm and 3.5 µm. Not only it is technologically easier to provide pump propagating preferentially in the LP01 mode of the pump (for example, by properly designed pump coupler device), but the manufacturing tolerances for the fiber are also relaxed, since the preferable range for $R_{RE}$ is 1 micron wide as opposed to 0.5 micron for the case of pumping with both LP01 and LP11 modes of the pump in equal proportion.

TABLE 3

Erbium ring $R_E$ position (from the centerline), and tolerances for $R_{RE}$ values

| | | | | | Step doping | | | Linear doping | | |
|---|---|---|---|---|---|---|---|---|---|---|
| $R_1$, μm | $\Delta_{1MAX}$, % | α | $\lambda_p$, μm | $P_{01}:P_{11}$ | $R_E$, μm | $\delta_+$ | $\delta_-$ | $R_E$, μm | $\delta_+$ | $\delta_-$ |
| 7.5 | 0.5 | 2 | 0.98 | 9:1 | 2.8 | +0.7 | −0.3 | 7.5 | +0 | −0.7 |
| | | | | 1:1 | 2.5 | +0.3 | −0.2 | 7.5 | +0 | −3.0 |
| | | | | 1:9 | 2.1 | +0.1 | −0.1 | 3.5 | +0.4 | −0.3 |
| | | | 1.48 | 9:1 | 2.4 | +0.2 | −0.2 | 7.5 | +0 | −3.3 |
| | | | | 1:1 | 1.7 | +0.1 | −0.1 | 3.0 | +0.2 | −0.2 |
| | | | | 1:9 | — | — | — | — | — | — |
| 7.5 | 0.4 | ∞ | 0.98 | 9:1 | 2.6 | +0.3 | −0.2 | | | |
| | | | 1.48 | 9:1 | 2/3 | +0.2 | −0.2 | | | |
| 6 | 0.5 | ∞ | 0.98 | 9:1 | 2.4 | +0.2 | −0.2 | 6 | +0 | −1.6 |
| | | | | 1:1 | 2 | +0.2 | −0.1 | 3.7 | +0.6 | −0.5 |
| | | | | 1:9 | no ring needed | | | no ring needed | | |
| | | | 1.48 | 9:1 | 2.2 | +0.2 | −0.2 | 4.5 | +1.5 | −0.8 |
| | | | | 1:1 | 1.6 | +0 | −0.1 | 2.6 | +0.2 | −0.2 |
| | | | | 1:9 | — | — | — | — | — | — |
| 4 | 0.85 | ∞ | 0.98 | 9:1 | 2 | +0.3 | −0.3 | — | — | — |
| | | | | 1:1 | 1.8 | +0.2 | −0.1 | 4 | +0 | −0.5 |
| | | | | 1:9 | 1.7 | +0.1 | −0.1 | 3 | +1 | −0.3 |
| | | | 1.48 | 9:1 | 1.9 | +0.2 | −0.2 | 4 | +0 | −0.3 |
| | | | | 1:1 | 1.7 | +0.1 | −0.2 | 4 | +0 | −1.2 |
| | | | | 1:9 | 1.2 | +0 | −0.1 | 1.8 | +0.1 | −0.1 |
| 3 | 1.4 | ∞ | 0.98 | 9:1 | 1.7 | +1.3 | −0.2 | — | — | — |
| | | | | 1:1 | 1.6 | +0.2 | −0.1 | — | — | — |
| | | | | 1:9 | 1.5 | +0.1 | −0.1 | 3 | +0 | −0.2 |
| | | | 1.48 | 9:1 | 1.6 | +0.2 | −0.2 | — | — | — |
| | | | | 1:1 | 1.5 | +0.1 | −0.1 | 3 | +0 | −0.2 |
| | | | | 1:9 | 1.3 | +0.1 | −0 | 2.3 | +0.7 | −0.2 |

Figure 7:
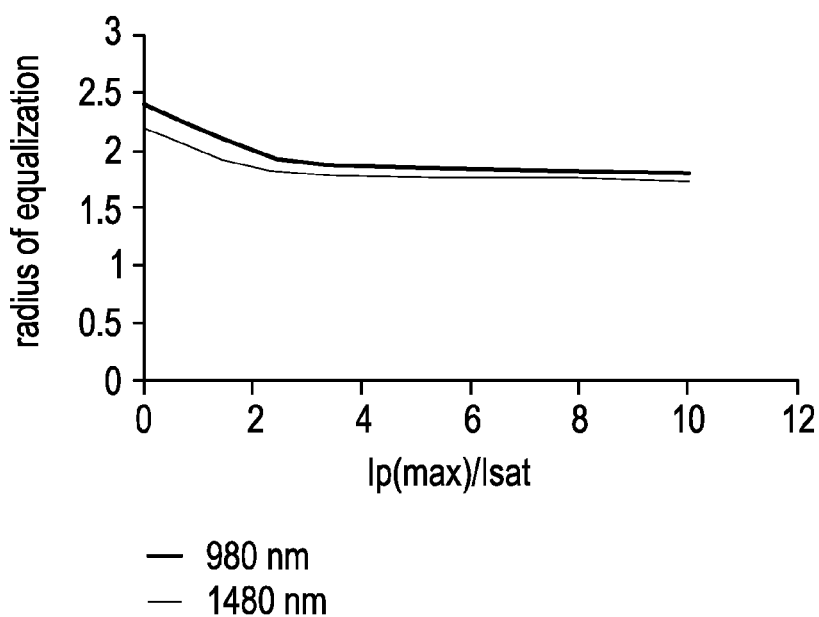
FIG. 7 illustrates the radius of modal gain equalization (for LP01 and LP11 modes) $R_E$ dependence on pump absorption saturation value $I_p/I_{sat}$ for one of the exemplary embodiments of Er-doped fiber.

Applicants also discovered that when equal gain is desired among different signal modes, the optimum for $R_{RE}$ (also referred to as a $R_E$ or radius of equalization herein) value changes little with whether or not pump absorption saturation condition exists. For example, FIG. 7 is a plot of the dependence of gain equalization radius $R_E$ on saturation strength $$\frac{I_{p,max}}{I_{p,sat}},$$

where $I_{p,max}$ is maximum intensity of the pump radiation within the fiber and $I_{p,sat}$ is the pump saturation intensity, a parameter dependent on the doping level, for one embodiment of the rare earth doped optical fiber 10 with the following parameters: $\Delta_{1\ max}$=0.5%, $R_1$=6 μm; step shape ring, when pumped with either the 980 nm pump, or the 1480 nm pump (i.e., $\lambda p$=980 nm, or $\lambda p$=1480 nm) This figure illustrates that that for $$\frac{I_{p,max}}{I_{p,sat}} > 3$$

(which is typical for high-performance Er-doped amplifiers) the modal gain equalization radius is almost constant. The difference between non-saturated and saturated case for these specific fiber parameters is less than 0.5 μm.

Table 4, below, compares three different Er doping profiles (similar to those illustrated in FIG. 4, for the few moded step-index optical fiber 10 with $R_1$=6 μm and $\Delta$=0.5%, and for different Ip/Isat ratios. It is seen that these exemplary embodiments with step and linearly decreasing doping profiles, the modal gain equalization radius shift is, although not by far, still outside the 10% tolerances calculated without pump absorption saturation. This means that in designing fibers for equalized gain for LP01 and LP11 modes of the signal, it may be important to take pump absorption saturation into account. Designing for Ip/Isat=3 might be a good practice achieving near ideal equalization for both weak and strong pump absorption saturation, but the design can be adjusted based on the projected output power (and therefore required pump power) of the amplifier. It is also noted that for the applications that require near equal gain, but with somewhat looser tolerances (e.g., in applications where being within 15% or 20% of equal gain is good enough), these types of rare earth dopant distributions will provide a satisfactory result.

TABLE 4

| | | | | | Step doping | | | Linear doping | | | Parabolic doping | | |
|---|---|---|---|---|---|---|---|---|---|---|---|---|---|
| $R_1$, μm | $\Delta$, % | α | $\lambda_p$, μm | Ip/Isat | $R_E$, μm | $\delta_+$ | $\delta_-$ | $R_E$, μm | $\delta_+$ | $\delta_-$ | $R_E$, μm | $\delta_+$ | $\delta$ |
| 6 | 0.5 | ∞ | 0.98 | 0 | 2.4 | +0.2 | −0.2 | 6 | +0 | −1.6 | 3.7 | | |
| | | | | 1 | 2.2 | | | 5 | | | 3.3 | | |
| | | | | 3 | 1.9 | | | 4.2 | | | 3 | | |
| | | | | 10 | 1.8 | | | 3.8 | | | 2.8 | | |
| | | | 1.48 | 0 | 2.2 | +0.2 | −0.2 | 4.5 | +1.5 | −0.8 | 3.2 | | |

TABLE 4-continued

| | | | | | Step doping | | | Linear doping | | | Parabolic doping | | |
|---|---|---|---|---|---|---|---|---|---|---|---|---|---|
| $R_1$, μm | Δ, % | α | $\lambda_p$, μm | Ip/Isat | $R_E$, μm | $\delta_+$ | $\delta_-$ | $R_E$, μm | $\delta_+$ | $\delta_-$ | $R_E$, μm | $\delta_+$ | $\delta$ |
| | | | | 1 | 2 | | | 4 | | | 2.9 | | |
| | | | | 3 | 1.9 | | | 3.7 | | | 2.7 | | |
| | | | | 10 | 1.8 | | | 3.5 | | | 2.7 | | |

Analysis of Table 4 and FIG. 7 also illustrates that the dependence of equalization radius on pump absorption saturation is weak starting from the rate of saturation Ip/Isat≈3 and higher. The absolute difference between equalization radii with pump saturation and without it is about 0.5 μm. Thus we can conclude that one can find/calculate doping profiles which work equally good both for higher and lower gain saturation.

Figure 8A:
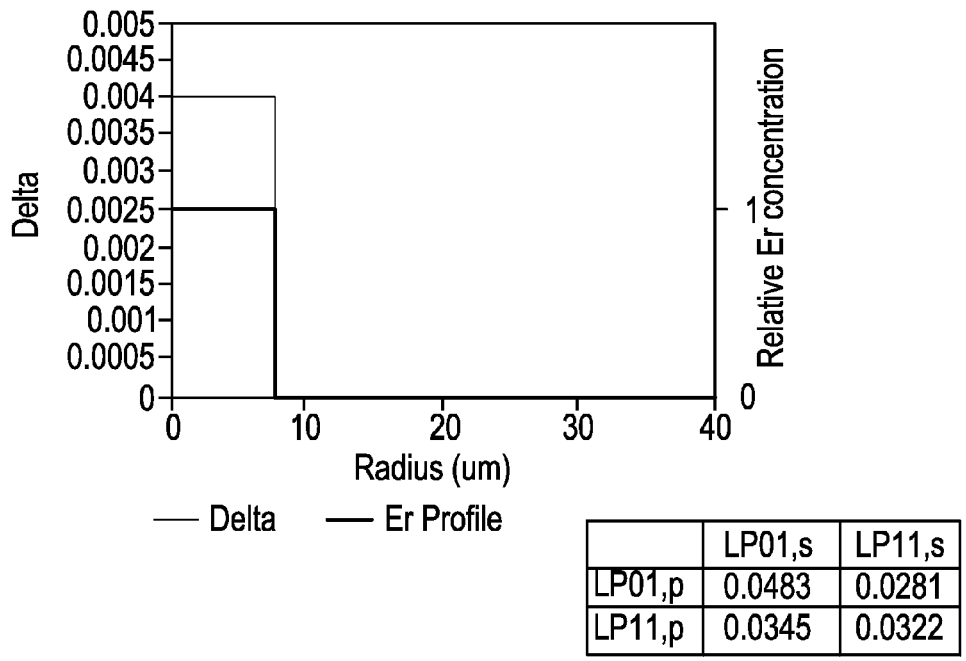
FIG. 8A-E illustrate refractive index and Er doping profiles for various exemplary embodiments of Er-doped few-moded fiber as well as calculated gain values of the LP01 and LP11 modes of the signal when pumping with either LP01 or LP11 mode of the pump.

Applicants discovered that merely scaling up a typical single mode rare earth doped fiber to provide a larger diameter core that can propagate a signal in 2 to 10 optical modes, does not result in fiber that has an equal, or nearly equal gain between the fundamental and the higher order modes(s). A comparative exemplary fiber profile, and its Er concentration profile are illustrated in FIG. 8A. As we can see, when the pump light is propagating in LP01 mode of the pump (at 980 nm wavelength), the gain for the signal in LP01 mode is much higher than the gain for the signal in LP11 mode. The situation is improved if the pump is propagating in the LP11 mode of the pump, but still the gains for LP01 and LP11 signal modes (LP01,s; LP11,s) are not fully equalized, with gain for LP01 signal mode still higher.

| | LP01, s | LP11, s |
|---|---|---|
| LP01, p | 0.0483 | 0.0281 |
| LP11, p | 0.0345 | 0.0322 |

Although rare earth doped fibers with the uniform concentration of Er within a core would typically provide higher gain in the LP01 than in the LP11 mode, Applicants discovered that it is possible to utilize uneven doping of the rare earth within the core to advantageously equalize the gain between LP01 and the LP11 signals.

Applicants also realized that propagation and/or splicing losses tend to be higher for the higher order signal modes propagating through the fiber and discovered that it is possible to utilize uneven doping of the rare earth doped core in a few moded fiber 10 to advantageously control the gain so that it is higher for the LP11 mode than for the LP01 mode, so that higher losses in the higher optical modes can be compensated.

Figure 8B:
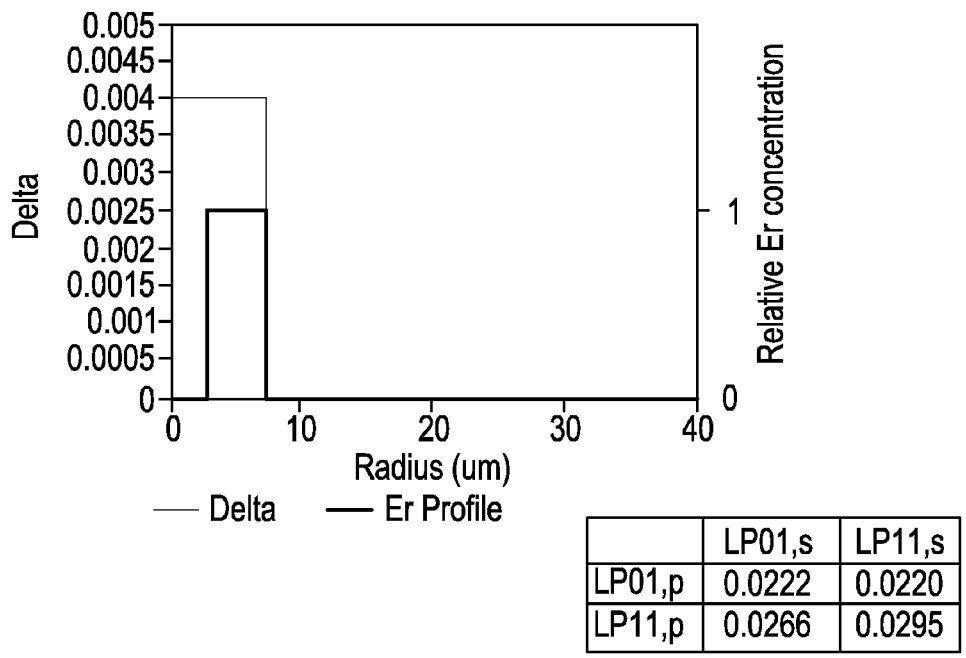
Figure 8C:
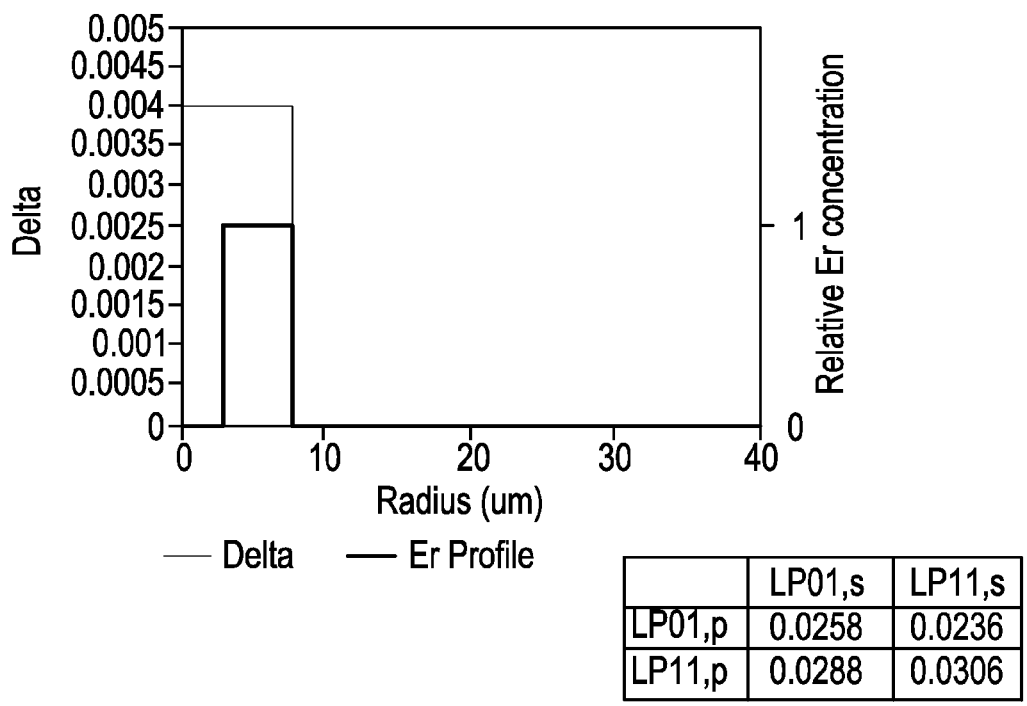
Figure 8D:
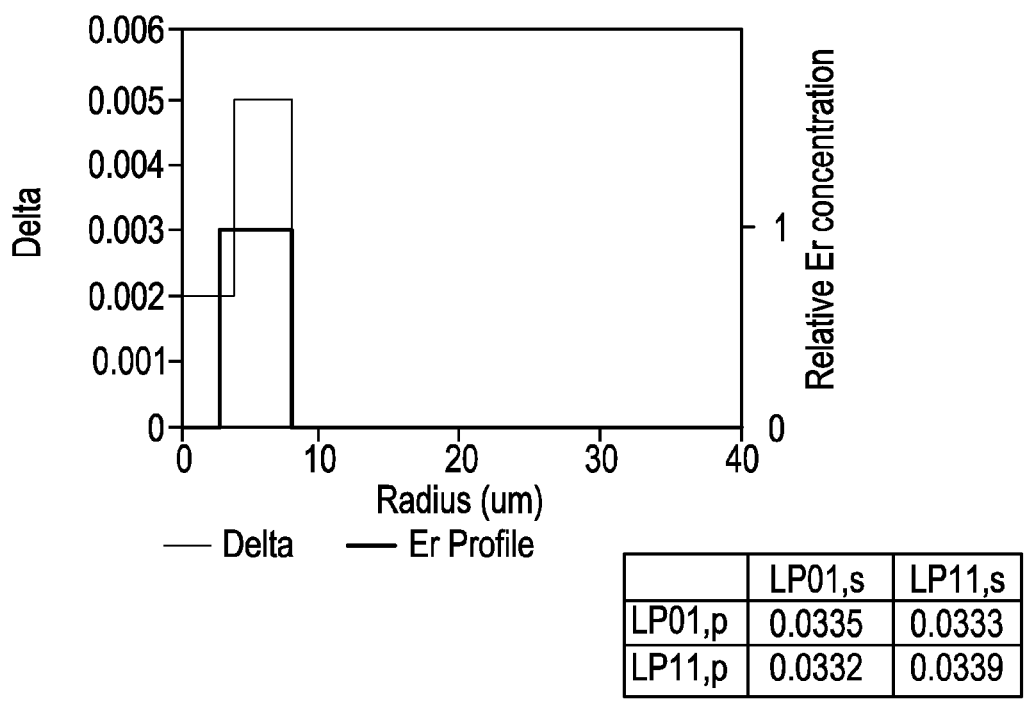
Figure 8E:
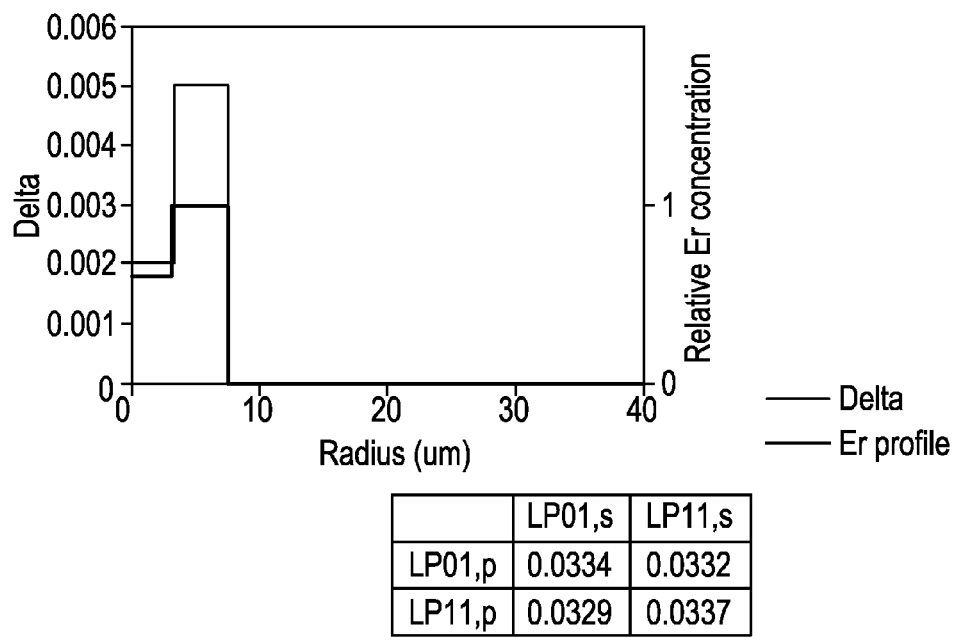

FIGS. 8B-8E depict exemplary refractive index profiles for the cores of four more exemplary embodiments of the few moded Er doped optical fiber 10, and the gains (LP01,s and LP11s) associated with these profiles. The pump wavelength used with these fiber embodiments is 980 nm. The refractive index delta profiles shown in FIGS. 8B and 8C are step index profiles similar to that shown in FIG. 2B. The refractive index delta profiles shown in FIGS. 8D and 8E are step index that are different from those shown in FIGS. 8B and 8C, because they include a lower refractive index in the center portion of the fiber core 20. FIGS. 8B-8E also show that for each of these exemplary fiber embodiments the signal gain in each of the propagating optical modes (LP01, LP11 is nearly equal).

According to at least some embodiments the few moded optical fiber 10 includes a core with a (first) portion of the core that has an average concentration of rare earth dopant which is much lower (by at least 30%, preferably by at least 40% and more preferably by at least 50%) than the average concentration of the rare earth dopant at another (second) portion of the core that is situated further from the core center. According to some embodiments, the fiber includes:

(i) the glass core having a radius $R_1$, said core containing a rare earth dopant such that the average concentration of said rare earth dopant is at least 1.5× (e.g., at least 40%, and more preferably by at least 50%) lower in the portion of the core with a width Wa≥0.1$R_1$ that is situated within a portion of the core where 0<r<0.5$R_1$ than the average concentration of the rare earth dopant in at least in one portion of the core with a width Wb of at least 1 μm that is situated in a portion of the core characterized by a center radius $r_c$ where 0.5$R_1$<$r_c$<$R_1$ (for example, 0.65$R_1$<$r_c$<0.9$R_1$);

and the width $W_d$ of the core portion doped with rare earth dopant is not less than 0.1$R_1$; and (ii) the cladding is a glass cladding surrounding and in direct contact with the glass core, wherein the glass cladding comprises a maximum relative refractive index delta $\Delta_{4MAX}$ with respect to pure silica, and $\Delta_{1MAX}>\Delta_{4MAX}$.

According to some embodiments the rare earth doped fiber 10 comprises a glass core structured to provide light amplification at an amplification wavelength and a cladding surrounding the core, said fiber comprising. The glass core has a radius $R_1$, sand contains a rare earth dopant such that the average concentration of said rare earth dopant is at least 1.5 times lower in the portion of the core with a width Wa≥0.1$R_1$ that is situated within a portion of the core where 0<r<0.5$R_1$ than the average concentration of the rare earth dopant in at least in one portion of the core with a width Wb≥0.1$R_1$ that is situated in a portion of the core characterized by a center radius $r_c$ where 0.5$R_1$<$r_c$<$R_1$; and the width $W_d$ of the core portion doped with rare earth is not less than 0.1$R_1$ (and preferably not less than 0.3$R_1$, and preferably not less than 0.5$R_1$). The cladding is a glass cladding surrounding and in direct contact with the glass core, wherein the glass cladding comprises a maximum relative refractive index delta $\Delta_{4MAX}$ with respect to pure silica, and $\Delta_{1MAX}>\Delta_{4MAX}$.

According to at least some embodiments the few moded optical fiber 10 includes:

(i) the glass core having a radius $R_1$, the core containing a rare earth dopant such that the average concentration of said rare earth dopant is at least 2 times lower in the portion of the core situated within 0<r<0.5$R_1$ than the average concentration of the rare earth dopant in at least in one portion of the core with a width W of at least 1 μm that is situated in a portion of the core characterized by a center radius $r_c$ where 0.5$R_1$<$r_c$<$R_1$; the width $W_d$ of the core portion doped with rare earth is not less than 0.1$R_1$; and (ii) the cladding is a glass cladding surrounding and in direct contact with the glass core, wherein the glass cladding comprises a maximum relative refractive index delta $\Delta_{4MAX}$ with respect to pure silica, and $\Delta_{1MAX} > \Delta_{4MAX}$. In some embodiments $0.65R_1 < r_c < 0.9R_1$.

Figure 9A:
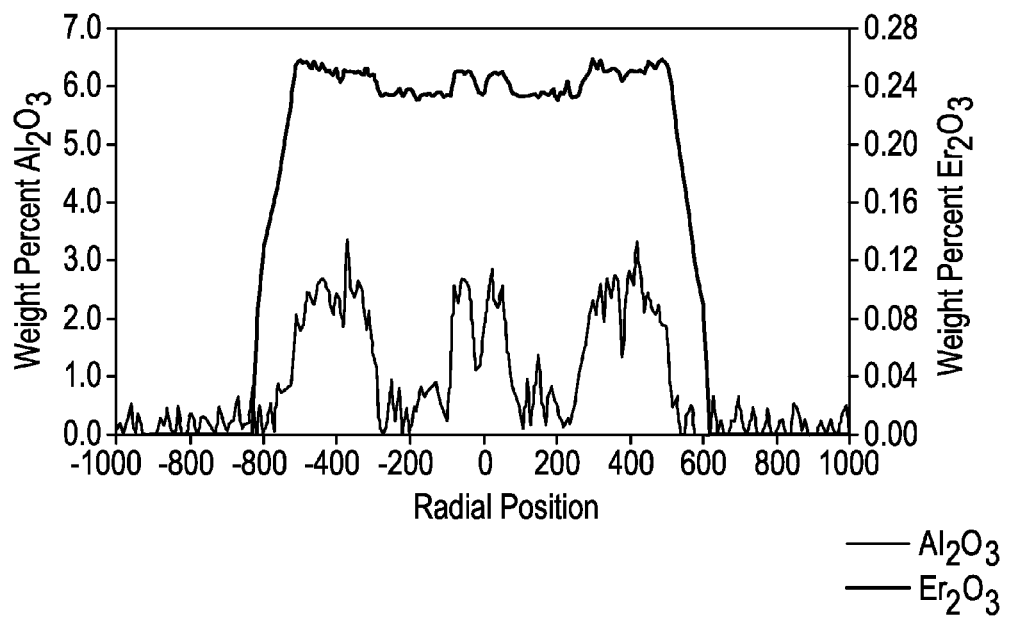
FIG. 9 A-D illustrate refractive index and Er-doping profiles for experimental Er-doped few-moded fibers manufactured according to the principles of the present invention.

We fabricated one experimental fiber preform that was made using the OVD process, for drawing an optical fiber 10 according to the embodiments of the present invention. More specifically, FIG. 9A shows the measurement results for the concentration of major dopants across the preform. In the figure, 0 corresponds to the geometrical center of the preform. As can be seen from the figure, the region corresponding to the fiber core is nearly uniformly doped with approximately 6% of $Al_2O_3$, which should result in approximately 0.5% fiber core delta, if the cladding is made of pure silica. The preform is drawn into the few moded fiber 10 such that the core diameter is ~12 μm, and therefore is similar in size to one exemplary embodiment described above, for which modeling results were given in the third row in Table 3. The Er doping, shown by a green line in FIG. 9A, corresponds to an optical fiber with a Er doped a ring wherein the inner radius $R_{RE}$ of the core portion 20B situated at about 50% of the core radius $R_1$ (i.e., $R_{RE}$ is ~3 μm if the core radius $R_1$ is 6 μm) and maximum Er concentration of 1000 ppm. (It is noted that according to Table 4, the optimum $R_{RE}$ value for gain equalization of the LP01 and LP11 modes of the signal is 2.4 μm without taking pump absorption saturation into account, and 1.8-1.9 μm for $I_p/I_{sat} > 3$). FIG. 9A also illustrates there is a spike of Er concentration in the geometrical center of the fiber preform, which will also be present in the fiber corresponding to FIG. 9B. This Er spike is related to the manufacturing technique used in making of this particular preform. If the Er spike was not present in the center of the core, one would expect that the gain for LP01 and LP11 signal modes will not be fully equalized in this experimental fiber embodiment. However, if the Er within the center spike comprises mostly active Er ions (e.g., due to the presence of de-clustering dopant in the core), then according to modified modeling results the modal gain for LP01 and LP11 modes will be almost equalized because this spike gain contribution balances the LP01 gain deficiency caused by the fact that $R_{RE}$ is larger than optimum.

Figure 9B:
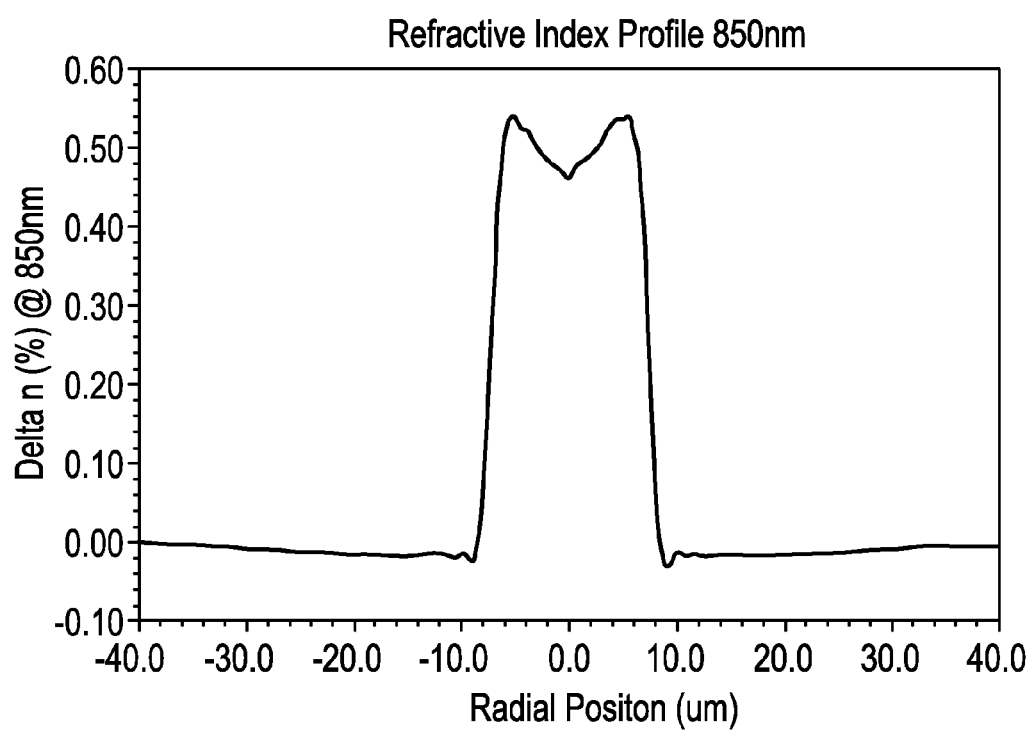

FIG. 9B is a graph of measured refractive index delta profile an exemplary embodiment of Er-doped few mode fiber 10 that was drawn from the preform of FIG. 9A. For the resulting fiber, the maximum $Er_2O_3$ doping concentration in the core is about 1100 ppm, and the $Al_2O_3$ doping concentration in the core is about 6 wt %. The resulted maximum core refractive index delta $\Delta_{1MAX}$ of the fiber 10 of this embodiment is about 0.54%.

Figure 9C:
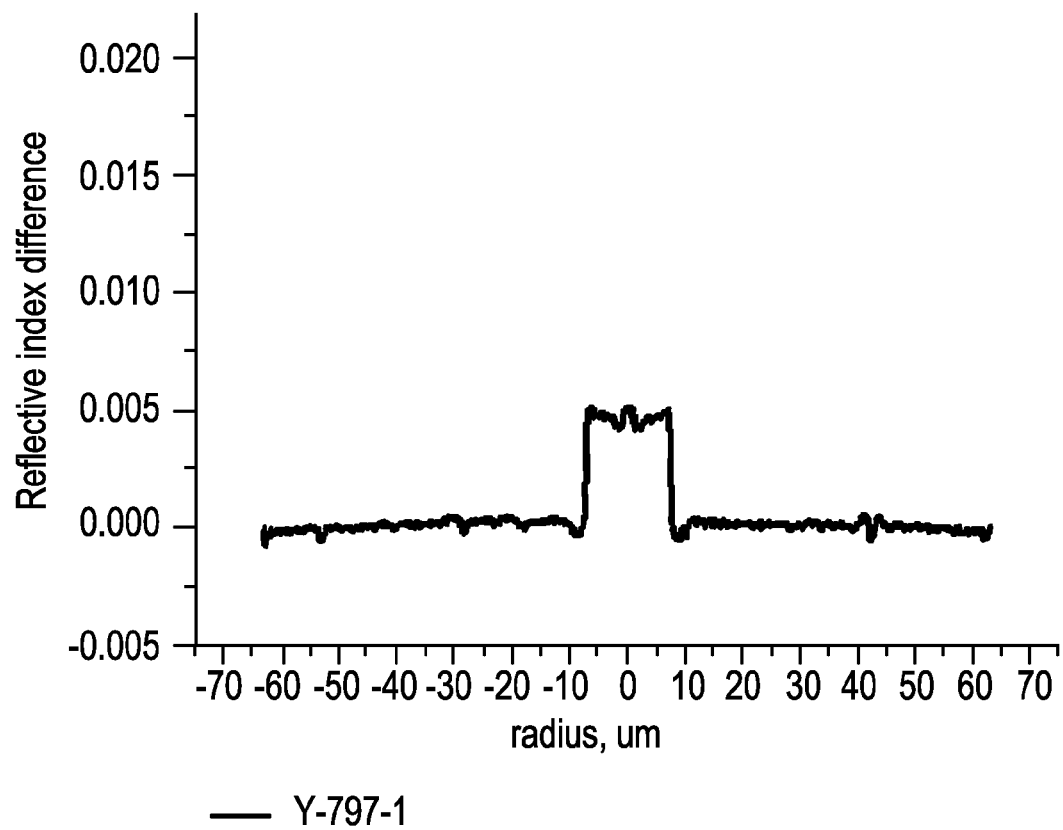
Figure 9D:
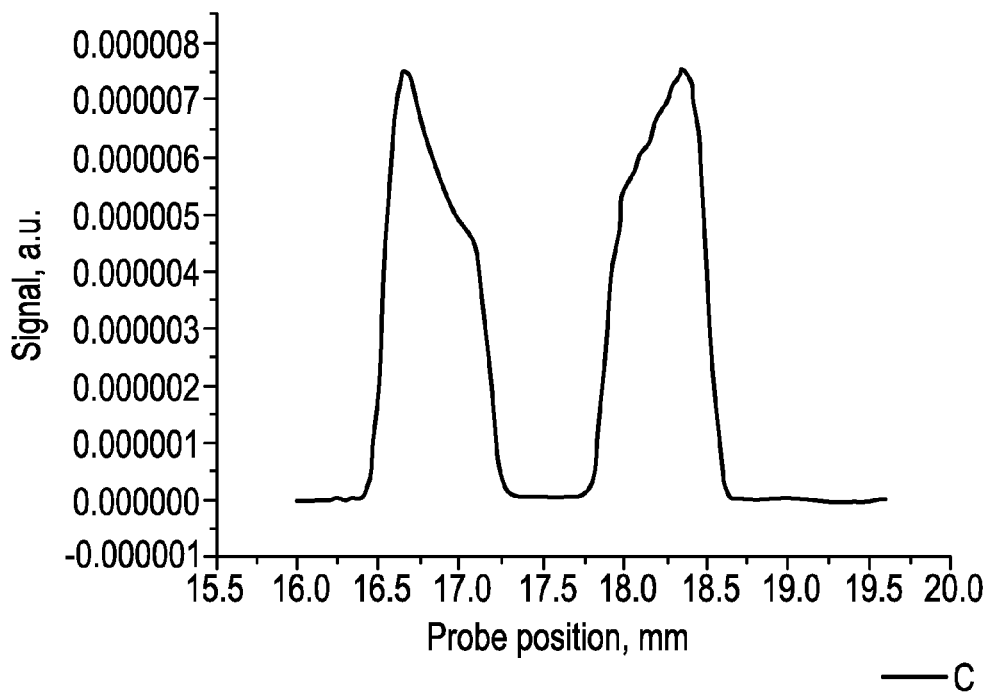

FIG. 9C illustrates a refractive index delta of yet another manufactured rare earth doped few moded optical fiber 10. This fiber was made using the MCVD process. In this embodiment, $\Delta_{1MAX}$=about 0.5%, and the core diameter ($2R_1$) is about 15 μm. FIG. 9D illustrates luminescence intensity for the preform of this fiber, due to the presence of the rare earth dopant in the core. The vertical axis of FIG. 9D represents luminescence signal intensity (in arbitrary units). The horizontal axis corresponds to the position of the measurement probe, with the value of 17.5 approximately corresponding to the center of the core. (Luminescence intensity was measured by pumping with a small spot that is moving across the face of the fiber preform.) Because luminescence intensity (as a function of the coordinate across the core) is proportional to the concentration of the rare earth within the core at that location, FIG. 9D shows that in this embodiment of the preform for the optical fiber 10 there is no rare earth within a central portion of the preform corresponding to the fiber core 20A, and that there is a high amount of rare earth dopant in the preform corresponding to the fiber core portion 20B. The embodiments of optical fiber 10 can amplify optical signals of each mode provided by a few mode transmission fiber and are suitable for making a few mode optical amplifier for MDM systems.

Figure 10:
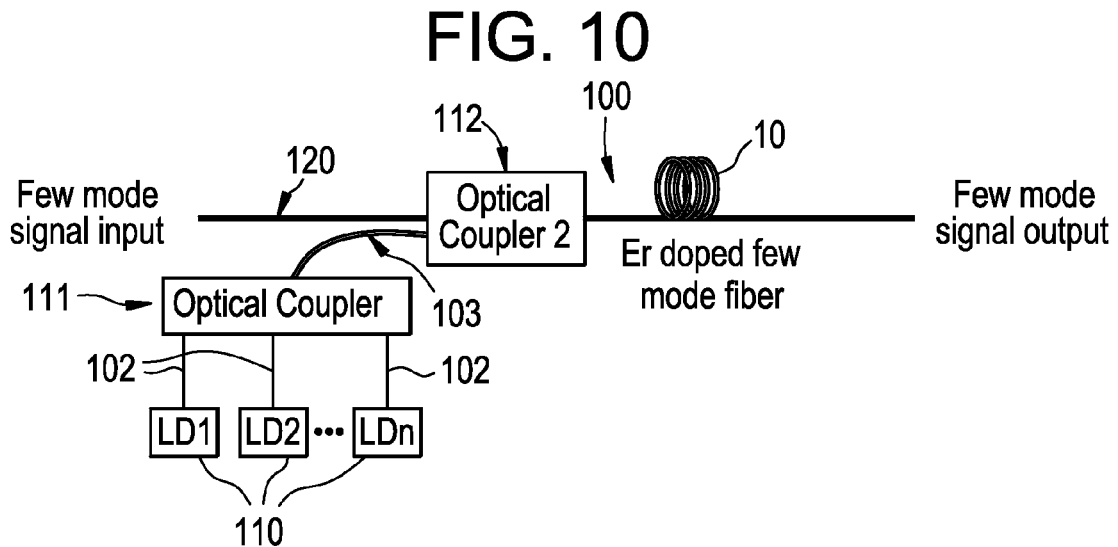
FIG. 10 is a schematic diagram of an example amplifier system that uses the few mode Er doped optical fiber.

According to some embodiments an optical amplifier comprises an Er doped few mode optical fiber 10, at least one pump light source optically coupled to the Er doped few mode optical fiber, 10 and at least one optical coupler coupled to said optical fiber for providing signal light to Er doped few mode optical fiber. Thus, the optical coupler can couple light from a few moded transmission fiber to the amplifying fiber which in this embodiment is the Er doped few mode optical fiber. Another optical coupler can couple the amplified light (several amplified modes) to a few moded transmission fiber which in this embodiment is the Er doped few mode optical fiber. Thus, advantageously, the multiple modes that need to be amplified can be amplified by a single optical amplifier. Also, advantageously, individual mode signals from the amplifier need not be converted back to the corresponding modes in an output few-mode transmission fiber, as would have to be done with amplifiers that utilize single mode (SM) amplifying fiber. Even more advantageously, the refractive index profiles of the few-mode transmission fiber and few-mode amplifier fiber can be designed such that the coupling between fibers, for all modes, can be done by simply splicing them together. Coupling of the pump light source to the few-mode amplifier fiber can be done by a number of coupler designs known in the art, for example by a free-space coupler utilizing a dichroic mirror. FIG. 10 shows schematically one embodiment of an optical amplifier that utilizes rare earth doped few moded optical fiber 10. This embodiment of the optical amplifier 100 includes a plurality of pump light sources 110 (e.g., Laser Diode $LD_1, LD_2, \ldots LDn$), optical couplers 120 and an Er doped few mode fiber 10. The length of Er doped fiber 10 is between a few meters (1 to 2 m, for example) to a couple of hundred meters (300 m, for example) depending on the gain coefficient of the optical fiber 10. Pump laser diodes $LD_1$ to LDn are optically coupled into the fiber 103 through the optical coupler 111, and then are coupled to the few mode Er doped optical fiber 10 through an optical coupler 112 to provide pump light in order to excite Er ion population in a few mode fiber 10. The pump light and optical signals from a few mode transmission fiber 120 are combined and coupled to the Er-doped few mode fiber 10 though optical coupler 112. The Er doped few mode fiber 10 absorbs the pump light and transfers energy to the optical signals to amplify them. An optional optical filter can be placed at the output of the optical fiber 10 in order to achieve flat gain spectrum in the wavelength band between 1530 to 1610 nm wavelengths. The configuration shown in FIG. 10 is known in the art as a co-propagating pump configuration. Those skilled in the art will recognize that a counter-propagating pump configuration, or both co-propagating and counter-propagating pump configuration, can be used instead. Cascading configuration with several concatenated segments of the few-mode amplifying fiber, can also be used.

In the embodiments shown and described herein, core 20 comprises pure silica glass ($SiO_2$) or silica glass with one or more dopants that increase the index of refraction of the glass core relative to pure, undoped silica glass. Suitable dopants for increasing the index of refraction of the core include, without limitation, $GeO_2$, $Al_2O_3$, $P_2O_5$, $TiO_2$, $ZrO_2$, $Nb_2O_5$, $Ta_2O_5$, and/or combinations thereof.

The cladding 50 may comprise pure silica glass (SiO$_2$), or silica glass with one or more dopants. The cladding may have one or more regions, for example an inner cladding and an outer cladding. The cladding may include dopant(s) which increase the index of refraction (e.g., GeO$_2$, Al$_2$O$_3$, P$_2$O$_5$, TiO$_2$, ZrO$_2$, Nb$_2$O$_5$ and/or Ta$_2$O$_5$), such as when the cladding is "up-doped", or silica glass with a dopant which decreases the index of refraction, such as fluorine, such as when a region of the cladding (e.g., the inner cladding) is "down-doped", so long as the maximum relative refractive index [$\Delta_{1MAX}$] of the core 20 is greater than the maximum relative refractive index [$\Delta_{4MAX}$] of the cladding 50. For example, in one embodiment, cladding 50 is pure silica glass.

The optical fiber may 10 may include a primary coating 62 contacting and surrounding the outer annular cladding region, and a secondary coating 64. The exemplary primary coating 62 has an in situ modulus of less than 0.35 MPa, preferably less than 0.3 MPa, more preferably less than 0.25 MPa, and in preferred embodiments not more than 0.2 MPa. The exemplary primary coating 62 has an in situ glass transition temperature less than –35° C., preferably less than –40° C., more preferably less than –45° C., and in preferred embodiments not more than –50° C. A primary coating with a low in situ modulus reduces the microbending which is the coupling mechanism between the modes propagating in the fiber. Since optical fiber 10 may to be packaged tightly bent, in order to provide a fiber amplifier with a smallest possible footprint, it is preferable to reduce the macrobending loss in the optical fiber 10. The secondary coating 64 contacts and surrounds the primary coating 62. The secondary coating 64 has an in situ modulus of greater than 1200 MPa, preferably greater than 1300 MPA, more preferably greater than 1400 MPa, and in preferred embodiments greater than 1500 MPa. A secondary coating with a high in situ modulus reduces the microbending which is the coupling mechanism between the modes propagating in the fiber.

The primary coating 62 preferably has a thickness that is less than about 40 µm, more preferably between about 20 µm to about 40 µm, most preferably between about 20 µm to about 30 µm. Primary coating 62 is typically applied to the glass fiber and subsequently cured, as will be described in more detail herein below. Various additives that enhance one or more properties of the primary coating can also be present, including antioxidants, adhesion promoters, PAG compounds, photosensitizers, carrier surfactants, tackifiers, catalysts, stabilizers, surface agents, and optical brighteners of the types described above.

A number of suitable primary coating compositions are disclosed, for example in U.S. Pat. No. 6,326,416 to Chien et al., U.S. Pat. No. 6,531,522 to Winningham et al., U.S. Pat. No. 6,539,152 to Fewkes et al., U.S. Pat. No. 6,563,996 to Winningham, U.S. Pat. No. 6,869,981 to Fewkes et al., U.S. Pat. Nos. 7,010,206 and 7,221,842 to Baker et al., and U.S. Pat. No. 7,423,105 to Winningham, each of which is incorporated herein by reference in its entirety.

Other suitable materials for use in outer (or secondary) coating materials, as well as considerations related to selection of these materials, are well known in the art and are described in U.S. Pat. Nos. 4,962,992 and 5,104,433 to Chapin, each of which is hereby incorporated by reference in its entirety The optical fibers of the present invention can be prepared using conventional draw tower technology for the preparation of the glass fiber and coatings thereof. Briefly, the process for making a coated optical fiber in accordance with the invention involves fabricating glass fiber with its core and cladding having the desired configuration, coating the glass fiber with the primary coating composition (62), the outer coating composition (64), and then curing all coatings simultaneously. This is known as a wet-on-wet process. Optionally, each subsequently applied coating composition can be applied to the coated fiber either before or after polymerizing the underlying coatings. The polymerization of underlying coatings prior to application of the subsequently applied coatings is known as a wet-on-dry process. When using a wet-on-dry process, additional polymerization steps must be employed.

It is well known to draw glass fibers from a specially prepared, cylindrical preform which has been locally and symmetrically heated to a temperature, e.g., of about 2000° C. As the preform is heated, such as by feeding the preform into and through a furnace, a glass fiber is drawn from the molten material. The primary, intermediate, and secondary coating compositions are applied to the glass fiber after it has been drawn from the preform, preferably immediately after cooling. The coating compositions are then cured to produce the coated optical fiber. The method of curing is preferably carried out by exposing the un-cured coating composition on the glass fiber to ultraviolet light or electron beam. It is frequently advantageous to apply both the several coating compositions in sequence following the draw process. Methods of applying dual layers of coating compositions to a moving glass fiber are disclosed in U.S. Pat. No. 4,474,830 to Taylor and U.S. Pat. No. 4,851,165 to Rennell et al., each of which is hereby incorporated by reference in its entirety.

In this embodiment a fiber coating 60 is adjacent to and surrounds the cladding 50 and comprises at least two layers: a primary coating 62 contacting and surrounding the cladding 50 and a secondary coating 64. In one example embodiment, the primary coating 62 has an in situ modulus of less than about 0.35 MPa, an in situ glass transition temperature less than about –35° C., and the secondary coating 64 surrounds the primary coating 62 and has an in situ modulus of greater than 1200 MPa.

In some embodiments, the LP01 effective area Aeff is greater than about 20 µm$^2$ and less than about 250 µm$^2$ at 1550 nm, and the theoretical cutoff wavelength of the LP11 mode is greater than about 2000 nm. More preferably, the LP01 effective area Aeff is greater than about 20 µm$^2$ and less than about 200 µm$^2$ at 1550 nm. Most preferably, the LP01 effective area Aeff is greater than about 25 µm$^2$ and less than about 150 µm$^2$ at 1550 nm.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A rare earth doped fiber comprising a glass core structured to provide light amplification at an amplification wavelength, a cladding surrounding the core, said fiber comprising:

(i) the glass core having a radius R$_1$ from about 3 µm to about 20 µm, a maximum relative refractive index delta $\Delta_{1MAX}$ from about between 0.3% to 2% relative to the glass cladding, and refractive index profile of the core is structured such that the core is capable of supporting the propagation and amplification of an optical signal consisting only of the LP01 and LP11 modes at the amplification wavelength and said core does not support propagation and amplification of optical signals with-modes higher than the LP11 mode at the amplification wavelength;

said core containing a rare earth dopant such that the average concentration of said rare earth dopant is at least 1.5 times lower in the portion of the core situated within $0<r<0.2\ R_1$ than the average concentration of the rare earth dopant in at least in one portion of the core with a width W of at least 1 μm that is situated in a portion of the core characterised by a center radius $r_c$ where $0.2R<r_c<R_1$;

and the width $W_d$ of the core portion doped with rare earth is not less than $0.1R_1$; and (ii) the cladding is a glass cladding surrounding and in direct contact with the glass core, wherein the glass cladding comprises a maximum relative refractive index delta $\Delta_{4MAX}$ with respect to pure silica, and $\Delta_{1MAX} > \Delta_{4MAX}$.

2. The rare earth doped fiber of claim 1 wherein said rare earth dopant is the rare-earth dopant is at least one of: Yb, Er, Nd, Tm, Sm, Gd, Pr, and Tb and wherein said gain wavelength is situated in one of the following wavelength bands: 625-640 nm, 940-1055 nm, 1280-1360 nm, 1440-1460 nm, 1490-1500 nm, 1540-1560 nm, 1645-1670 nm.

3. An optical fiber according to claim 1, wherein:

the core is structured such that the core is capable of supporting the propagation and amplification of the optical signal at a wavelength within a wavelength range that is at least 20 nm wide and situated around a center wavelength of 1550 nm;

the core containing $Er_2O_3$ such that the average concentration of $Er_2O_3$ is at least 2 times lower in the portion of the core situated within $0<r<0.2R_1$ than the average concentration of $Er_2O_3$ in at least in one portion of the core with a width W of at least 1 μm that is situated in a portion of the core characterised by a center radius $r_c$ where $0.2R_1<r_c<R_1$ wherein said portion of the core with a with a width W is doped with greater than 200 ppm of $Er_2O_3$.

4. The optical fiber according to claim 3 wherein and the width $W_d$ of the core portion doped with $Er_2O_3$ is at least $0.1R_1$.

5. An optical fiber according to claim 3, wherein $R_1$ is in the range 3 μm≤$R_1$≤15 μm, and an the core has an effective area for the-LP01 mode between 10 μm² and 100 μm² at 1550 nm; the average concentration of $Er_2O_3$ is at least 2 times lower in the portion of the core situated within $0<r<0.25\ R_1$ than the average concentration of $Er_2O_3$ in at least in one portion of the core with a width W of at least 1 μm that is situated in a portion of the core characterised by a center radius $r_c$ where $0.25R_1<r_c<R_1$ wherein said portion of the core is doped with greater than 300 ppm of $Er_2O_3$.

6. An optical fiber according to claim 3, wherein said portion of the core that has a width W of at least 1 μm is situated within $0.3R_1<r_c<R_1$ and is doped with greater than 700 ppm of $Er_2O_3$, at least 0.5 wt % of $Al_2O_3$ and 0 to 25 wt % of $GeO_2$.

7. The optical fiber of claim 6, wherein the concentration of $Al_2O_3$ in the core is between 2% and 10%.

8. The optical fiber according to claim 3, wherein said maximum relative refractive index delta $\Delta_{1MAX}$ is between 0.4 to 1% relative to the glass cladding, and the effective area of LP01 mode is between 50 μm² and 150 μm² at 1550 nm.

9. The optical fiber of claim 3 wherein refractive index profile of said core is constructed to have a theoretical cutoff wavelength for the LP11 mode that is greater than about 2.0 μm and to have an effective area for the LP01 mode of greater than 110 μm² at 1550 nm.

10. The optical fiber of claim 3 wherein said fiber comprises either a step-index profile or a core with a graded refractive index profile with an alpha value greater than or equal to about 1.8 and less than about 2.2 at a wavelength of 1550 nm.

11. The optical fiber of claim 3, wherein said fiber cladding includes a low index ring, and an outer cladding with a maximum relative refractive index delta $\Delta_{4MAX}$ surrounding the ring, and the minimum refractive index delta of the low index ring is between −0.6 and −0.2% relative to the outer cladding.

12. The optical fiber according to claim 3 wherein the Er dopant concentration within at least one portion of the core increases linearly or parabolicly, and/or is ring-shaped.

13. The rare earth doped fiber according to claim 3 wherein (i) at least a portion of the fiber core situated between $0.15R_1<r<0.6R_1$ contains rare earth dopant; and/or (ii) $0.65R_1<r_c<0.9\ R_1$.

14. An optical amplifier comprising:

an optical fiber of claim 1, at least one pump light source optically coupled to said optical fiber, and at least one optical coupler coupled to said optical fiber for providing signal light to said optical fiber.

15. An optical amplifier of claim 14 wherein (i) said optical fiber has an Er concentration within at least one portion of the core increases linearly or parabolicly, and/or is ring-shaped, and (ii) $0.65R_1<r_c<0.9R_1$.

* * * * *